(12) United States Patent
Lieberman

(10) Patent No.: US 11,695,813 B2
(45) Date of Patent: Jul. 4, 2023

(54) CONVERSATIONAL SOCIAL NETWORK

(71) Applicant: Pattr Co., Bronx, NY (US)

(72) Inventor: Abraham Lieberman, Bronx, NY (US)

(73) Assignee: PATTR CO., Bronx, NY (US)

( * ) Notice: Subject to any disclaimer, the term of this patent is extended or adjusted under 35 U.S.C. 154(b) by 0 days.

(21) Appl. No.: 17/137,839

(22) Filed: Dec. 30, 2020

(65) Prior Publication Data

US 2022/0210208 A1 Jun. 30, 2022

(51) Int. Cl.
*H04L 65/4038* (2022.01)
*H04L 67/306* (2022.01)
*H04L 12/18* (2006.01)
*H04L 51/52* (2022.01)

(52) U.S. Cl.
CPC ...... *H04L 65/4038* (2013.01); *H04L 12/1831* (2013.01); *H04L 51/52* (2022.05); *H04L 67/306* (2013.01)

(58) Field of Classification Search
CPC . H04L 65/4038; H04L 12/1831; H04L 51/32; H04L 67/306
USPC .......................................................... 709/204
See application file for complete search history.

(56) References Cited

U.S. PATENT DOCUMENTS

| | | | |
|---|---|---|---|
| 9,542,669 B1 * | 1/2017 | Browning | G06Q 10/109 |
| 10,608,968 B2 * | 3/2020 | Higgins | G06N 5/02 |
| 10,807,006 B1 | 10/2020 | Davis et al. | |
| 2012/0236103 A1 * | 9/2012 | Cahill | H04N 7/147 |
| | | | 348/14.01 |
| 2014/0218461 A1 * | 8/2014 | DeLand | H04N 7/15 |
| | | | 348/14.07 |
| 2015/0256634 A1 * | 9/2015 | Bastide | G06Q 50/01 |
| | | | 709/204 |
| 2016/0203831 A1 * | 7/2016 | Elyashiv | G10L 25/48 |
| | | | 704/270 |
| 2016/0210279 A1 * | 7/2016 | Kim | G06F 40/30 |
| 2018/0316733 A1 * | 11/2018 | Chandran | H04L 12/1827 |
| 2019/0052584 A1 * | 2/2019 | Barve | G06Q 30/016 |

(Continued)

OTHER PUBLICATIONS

Rindner, "Clubhouse Is the New Social Media App Everyone's Talking About—but Few Are Invited to", article from https://www.oprahdaily.com/entertainment/a34376747/what-is-clubhouse-social-media-app/, Oct. 15, 2020 (Year: 2020).*

*Primary Examiner* — Nicholas R Taylor
*Assistant Examiner* — Chong G Kim
(74) *Attorney, Agent, or Firm* — Soquel Group I.P Ltd.

(57) ABSTRACT

Systems and methods for setting up live online conversations between people, and selecting participants for such conversations in a manner that optimizes the enjoyment of the participants. Conversations are analyzed and attributes of participants and conversations are extracted from the audio of the conversations. A quality level of the conversations is determined from the audio, and subjective quality assessments may be received from participants. Participants and conversations are divided into classes and clusters, where the classes and clusters represent groups of entities which have certain attributes in common. Based on the attributes, classes, clusters, and quality levels, compatibilities are determined between arbitrary pairs of participants and for arbitrary groups of participants. Conversations are generated, and participants are selected for the conversations based on the determined compatibilities.

14 Claims, 20 Drawing Sheets

(56) References Cited

U.S. PATENT DOCUMENTS

| | | | |
|---|---|---|---|
| 2019/0279619 A1* | 9/2019 | Krasadakis | G06F 16/683 |
| 2019/0305976 A1* | 10/2019 | Bender | G10L 15/1807 |
| 2019/0306105 A1* | 10/2019 | Snibbe | G10L 25/63 |
| 2020/0192981 A1* | 6/2020 | Fox | G06F 40/30 |
| 2020/0342858 A1* | 10/2020 | Gupta | G10L 15/1815 |
| 2021/0076002 A1* | 3/2021 | Peters | G06K 9/00718 |
| 2021/0271864 A1* | 9/2021 | Litvin | G06K 9/00335 |
| 2021/0272584 A1* | 9/2021 | McAlpine | A63F 13/87 |
| 2021/0295728 A1* | 9/2021 | Sarrafzadeh | G06K 9/00288 |

* cited by examiner

CONVERSATIONAL SOCIAL NETWORK

FIELD OF THE INVENTION

The present invention relates to the field of social networking.

BACKGROUND OF THE INVENTION

Many technology solutions exist for facilitating social interactions between people. These solutions are commonly known as "social media" or "social networking" applications.

Socializing in the context of these applications typically occurs in one or more of a number of modalities, including inter alia (i) posting pictures, videos, or stories to an application and allowing specified groups of people to view them or comment on them, (ii) posting texts, pictures or videos to an application in a public manner and allowing any other users to subscribe to the content, (iii) conversing with others via text messages, and (iv) conversing with others via audio or video conversation.

A popular application that encourages posting content as described in (i) above is FACEBOOK®. Facebook is a registered trademark of Facebook, Inc. of Menlo Park, Calif.

A popular application that encourages posting content and allowing users to subscribe to the content as described in (ii) above is TWITTER®. Twitter is a registered trademark of Twitter, Inc, of San Francisco, Calif. An additional example of such an application is INSTAGRAM®. Instagram is a registered trademark of Instagram, LLC of Menlo Park, Calif. Subscribing to a user's content in such applications is commonly referred to as "following". The content consumed when following one or more people in such applications is known as a "feed".

A popular application that encourages conversing via text messages, via audio conversations, and via video conversations is WHATSAPP®. WhatsApp is a registered trademark of WhatsApp Inc. of Menlo Park, Calif.

Existing social networking applications that facilitate audio or video conversations typically do not facilitate or encourage conversations between people who do not already know one another.

Existing social networking applications that facilitate audio or video conversations between people who do not already know one another typically place people in a conversation in a manner that is effectively random.

It will be appreciated by those skilled in the art that following people on social media, and consuming the feeds of others, do not typically meet all of people's inherent needs for socializing.

It will be further appreciated by those skilled in the art that having an audio or audiovisual conversation with another person or with multiple other people where the participants are chosen effectively at random, will not necessarily lead to conversations that are enjoyable for the participants.

There is therefore a need for a social networking application that enables and encourages social conversations between people in a manner that better meets people's social needs and desires.

SUMMARY

The present invention includes a system for setting up audio or audiovisual conversations between people in a manner whereby the members of the conversation are selected in order to optimize the subjective quality and enjoyment of the conversation for all its members.

Aspects of the present invention provide a mechanism for analyzing conversations, and determining, based on the analysis, a set of attributes of the conversations and a set of attributes of the participants in the conversations, the attributes being inter alia non-verbal attributes.

In addition, aspects of the present invention provide a mechanism for dividing conversations and conversation participants into classes and clusters, where the classes and clusters represent groups of entities which have certain attributes in common.

Furthermore, aspects of the present invention provide a mechanism for attributing a quality level to a conversation.

Yet furthermore, aspects of the present invention provide a mechanism for generating a conversational compatibility prediction between arbitrary pairs of people, and between arbitrary groups of people. The compatibility prediction utilizes the conversation attributes, participant attributes, classes, clusters, and quality levels in order to predict which pairs or groups of people have the highest probability of engaging in a conversation which they subjectively determine to be enjoyable.

Additionally, aspects of the present invention provide a mechanism for selecting participants for a conversation, and for dividing a group of participants into multiple conversations. The selecting and dividing utilize the compatibility predictions in order to create optimal pairings and groupings of participants.

Furthermore, aspects of the present invention provide a mechanism for creating a one-on-one or multi-participant audio or audiovisual conversation, and for placing users in the conversation. The placing of participants utilizes the selecting and dividing in order to create the most enjoyable conversations.

Furthermore, aspects of the present invention provide a mechanism for creating what is referred to herein as a "room". A room is a conversation in which multiple people participate, and which may be replicated into multiple instances if a sufficiently large number of participants joins, whereby each instance becomes an independent conversation among a subset of the participants.

There is thus provided in accordance with an embodiment of the present invention a system for selecting a participant for a live online conversation, including a conversation analyzer analyzing audio of a set of participants of multiple online conversations, and determining non-verbal attributes of each participant's speech in the conversations, the participants including a designated participant, a social network manager receiving a request from the designated participant to have a conversation with an unspecified second participant, and a participant manager selecting a second participant from the participants in the multiple online conversations, based on the attributes of the designated participant and the attributes of the other participants determined by the conversation analyzer, in response to the social network manager receiving the request.

There is additionally provided in accordance with an embodiment of the present invention a system for generating online conversations, including a conversation analyzer analyzing audio of participants of multiple online conversations, and determining non-verbal attributes of each participant's speech in the conversations, a social network manager receiving a request from a plurality of the participants to join a live online conversation, and a conversation manager generating multiple live online conversations according to the number of requests received by the social network manager, and allocating the requesting participants to the generated live online conversations, based on the attributes of the requesting participants determined by the conversation analyzer, in response to the social network manager receiving the request.

There is further provided in accordance with an embodiment of the present invention a computer readable medium storing instructions, which, when executed by a processor of an electronic device, cause the processor to analyze audio of a set of participants of multiple online conversations, the participants including a designated participant, determine non-verbal attributes of each participant's speech in the conversations, receive a request from the designated participant to join a live online conversation from among a plurality of live online conversations, each live online conversation having its own set of participants, where one or more of the participants also participated in one or more of the analyzed conversations, and select an online conversation for the designated participant to join, from among the plurality of live online conversations, based on the determined attributes of the plurality of participants.

There is yet further provided in accordance with an embodiment of the present invention a method for selecting a participant for a live online conversation, including analyzing audio of a set of participants of respective multiple online conversations, determining a relative amount of time that each participant was speaking in the respective conversations as compared to other participants in the respective conversations, receiving a request from a designated participant to have a conversation with an unspecified second participant, and selecting a second participant from the participants in the respective conversations based on the relative amount of time the designated participant was speaking in the respective conversations, and based on the relative amounts of time the other participants were speaking in the respective conversations.

There is moreover provided in accordance with an embodiment of the present invention a method for selecting a participant for a live online conversation, including analyzing audio of a set of participants of respective multiple online conversations, determining a relative number of times that each participant in the respective conversations interrupted another participant in the respective conversations as compared to the number of times that all the participants in the respective conversations interrupted other participants in the respective conversations, receiving a request from a designated participant to have a conversation with an unspecified second participant, and selecting a second participant from the participants in the respective conversations based on the relative number of times the designated participant interrupted participants in the respective conversations, and based on the relative numbers of times the other participants interrupted participants in the respective conversations.

There is additionally provided in accordance with an embodiment of the present invention a method for selecting a participant for a live online conversation, including analyzing audio of a set of participants of respective multiple online conversations, determining a relative number of times that each participant in the respective conversations was interrupted by another participant in the respective conversations as compared to the number of times that all the participants in the respective conversations were interrupted by other participants in the respective conversations, receiving a request from a designated participant to have a conversation with an unspecified second participant, and selecting a second participant from the participants in the respective conversations based on the relative number of times the designated participant was interrupted by participants in the respective conversations, and based on the relative numbers of times the other participants were interrupted by participants in the respective conversations.

There is further provided in accordance with an embodiment of the present invention a method for selecting a participant for a live online conversation, including receiving friend requests from one or more participants in multiple online conversations, targeted at other participants in the respective conversation, determining the number of times each participant was the target of a friend request, receiving a request from a designated participant to have a conversation with an unspecified second participant, and selecting a second participant from the participants in the multiple online conversations based on the number of times the designated participant was the target of a friend request, and based on the numbers of times the other participants in the multiple online conversations were targets of a friend request.

There is yet further provided in accordance with an embodiment of the present invention a method for selecting a participant for a live online conversation, including receiving subjective ratings from one or more participants in multiple online conversations for other participants in the respective conversation, calculating a rating score for participants based on the subjective ratings, receiving a request from a designated participant to have a conversation with an unspecified second participant, and selecting a second participant from the participants in the multiple online conversations based on the rating score of the designated participant, and based on the rating scores of the other participants in the multiple online conversations.

There is moreover provided in accordance with an embodiment of the present invention a method for selecting a participant for a live online conversation, including analyzing audio of a set of respective multiple online conversations, each conversation having multiple participants, determining that a designated pair of participants in a designated conversation conversed with each other in the designated conversation, receiving a request from one member of the designated pair of participants to have a conversation with an unspecified second participant, and selecting the designated second member of the designated pair of participants from among the participants in the respective multiple online conversations.

There is additionally provided in accordance with an embodiment of the present invention a method for allocating participants to a plurality of live online conversations, including analyzing audio of a set of participants of respective multiple online conversations, determining a relative amount of time that each participant was speaking in the respective conversations as compared to other participants in the respective conversations, receiving requests from a plurality of participants to join a live online conversation, creating multiple live online conversations according to the number of requests received; and allocating the plurality of participants to the live online conversations based on the relative amounts of time the respective participants were speaking in the respective conversations.

There is further provided in accordance with an embodiment of the present invention a method for allocating participants to a plurality of live online conversations, including analyzing audio of a set of participants of respective multiple online conversations, determining a relative number of times that each participant interrupted another participant in the respective conversations as compared to the number of times that all the participants in the respective conversations interrupted other participants in the respective conversations, receiving requests from a plurality of participants to join a live online conversation, creating multiple live online conversations according to the number of requests received, and allocating the plurality of participants to the live online conversations based on the relative numbers of times the respective participants interrupted other participants in the respective conversations.

There is yet further provided in accordance with an embodiment of the present invention a method for allocating participants to a plurality of live online conversations, including analyzing audio of a set of participants of respective multiple online conversations, determining a relative number of times that each participant was interrupted by another participant in the respective conversations as compared to the number of times that all the participants in the respective conversations were interrupted by other participants in the respective conversations, receiving requests from a plurality of participants to join a live online conversation, creating multiple live online conversations according to the number of requests received, and allocating the plurality of participants to the live online conversations based on the relative numbers of times the respective participants were interrupted by other participants in the respective conversations.

There is moreover provided in accordance with an embodiment of the present invention a method for allocating participants to a plurality of live online conversations, including receiving friend requests from one or more participants in multiple online conversations, targeted at other participants in the respective conversation, determining the number of times each participant was the target of a friend request, receiving requests from a plurality of participants to join a live online conversation, creating multiple live online conversations according to the number of requests received, and allocating the plurality of participants to the live online conversations based on the numbers of times the respective participants were targets of a friend request.

There is additionally provided in accordance with an embodiment of the present invention a method for allocating participants to a plurality of live online conversations, including receiving subjective ratings from one or more participants in multiple online conversations for other participants in the respective conversation, calculating a rating score for participants based on the subjective ratings, receiving requests from a plurality of participants to join a live online conversation, creating multiple live online conversations according to the number of requests received, and allocating the plurality of participants to the live online conversations based on the rating scores of the participants.

There is further provided in accordance with an embodiment of the present invention a method for adding participants to a plurality of live online conversations, including analyzing audio of a set of participants of respective multiple online conversations, determining a relative amount of time that each participant was speaking in the respective conversations as compared to other participants in the respective conversations, receiving a request from a designated participant to join a live online conversation from among a plurality of live online conversations, each live online conversation having its own set of participants, where one or more of the participants also participated in one or more of the respective conversations, and selecting an online conversation from among the plurality of live online conversations, based on the relative amount of time the designated participant was speaking in the respective conversations, and based on the relative amounts of time the respective participants in the plurality of live online conversations were speaking in the respective conversations.

There is yet further provided in accordance with an embodiment of the present invention a method for adding participants to a plurality of live online conversations, including analyzing audio of a set of participants of respective multiple online conversations, determining a relative number of times that each participant interrupted another participant in the respective conversations as compared to the number of times that all the participants in the respective conversations interrupted other participants, receiving a request from a designated participant to join a live online conversation from among a plurality of live online conversations, each live online conversation having its own set of participants, where one or more of the participants also participated in one or more of the respective conversations, and selecting an online conversation from among the plurality of live online conversations, based on the relative number of times the designated participant interrupted another participant in the respective conversations and based on the relative numbers of times the respective participants in the plurality of live online conversations interrupted other participants in the respective conversations.

There is moreover provided in accordance with an embodiment of the present invention a method for adding participants to a plurality of live online conversations, including analyzing audio of a set of participants of respective multiple online conversations, determining a relative number of times that each participant was interrupted by another participant in the respective conversations as compared to the number of times that all the participants in the respective conversations were interrupted by other participants, receiving a request from a designated participant to join a live online conversation from among a plurality of live online conversations, each live online conversation having its own set of participants, where one or more of the participants also participated in one or more of the respective conversations, and selecting an online conversation from among the plurality of live online conversations, based on the relative number of times the designated participant was interrupted by another participant in the respective conversations and based on the relative numbers of times the respective participants in the plurality of live online conversations were interrupted by other participants in the respective conversations.

There is additionally provided in accordance with an embodiment of the present invention a method for adding participants to a plurality of live online conversations, including receiving friend requests from one or more participants in multiple online conversations, targeted at other participants in the respective conversation, determining the number of times each participant was the target of a friend request, receiving a request from a designated participant to join a live online conversation from among a plurality of live online conversations, each live online conversation having its own set of participants, and selecting an online conversation from among the plurality of live online conversations, based on the number of times the designated participant was the target of a friend request, and based on the numbers of times the respective participants in the plurality of live online conversations were targets of a friend request.

There is further provided in accordance with an embodiment of the present invention a method for adding participants to a plurality of live online conversations, including receiving subjective ratings from one or more participants in multiple online conversations for other participants in the respective conversation, calculating a rating score for participants based on the subjective ratings, receiving a request from a designated participant to join a live online conversation from among a plurality of live online conversations, each live online conversation having its own set of participants, and selecting an online conversation from among the plurality of live online conversations, based on the rating score of the designated participant, and based on the respective rating scores of the participants in the plurality of live online conversations.

There is yet further provided in accordance with an embodiment of the present invention a method for adding participants to a plurality of live online conversations, including analyzing audio of a set of participants of respective multiple online conversations, determining a relative amount of time that a designated participant was speaking in the respective conversations as compared to other participants in the respective conversations, receiving a request from the designated participant to join a live online conversation from among a plurality of live online conversations, each live online conversation having its own set of participants, determining the relative amounts of time participants in the live online conversations have been speaking, and selecting an online conversation from among the plurality of live online conversations, based on the relative amount of time the designated participant was speaking in the respective conversations, and based on the relative amounts of time the respective participants in the plurality of live online conversations have been speaking.

There is moreover provided in accordance with an embodiment of the present invention a method for adding participants to a plurality of live online conversations, including analyzing audio of a set of participants of respective multiple online conversations, determining a relative number of times that a designated participant interrupted another participant in the respective conversations as compared to the number of times that all participants in the respective conversations interrupted other participants, receiving a request from the designated participant to join a live online conversation from among a plurality of live online conversations, each live online conversation having its own set of participants, determining the relative numbers of times participants in the live online conversations interrupted other participants, and selecting an online conversation from among the plurality of live online conversations, based on the relative number of times the designated participant interrupted other participants in the respective conversations, and based on the relative numbers of times the respective participants in the plurality of live online conversations have interrupted other participants.

Definitions

The following definitions are employed throughout the specification:
AROUSAL—in the field of psychology, the intensity of an emotion.
CONVERSATION—an audio or audiovisual discussion between two or more people, lasting an indeterminate amount of time. The discussion may have a fixed set of participants, or a variable set of participants where participants join and leave during the course of the discussion.
NON-VERBAL ATTRIBUTE—an attribute of a conversation that is related to the audio of the conversation and is unrelated to the words spoken.
OVERTALKING—a condition where two or more people in a conversation are talking at the same time.
ROOM—a conversation which multiple participants may join, and which may split into multiple instances of itself if a sufficiently large number of participants joins.
VALENCE—in the field of psychology, the categorization of emotions into positive, or "good", emotions, and negative, or "bad", emotions, or the extent to which emotions are positive or negative.
VIDEO CALL—a live conversation consisting of both audio and video.
VOICE CALL—a live conversation consisting of only of audio.

BRIEF DESCRIPTION OF THE DRAWINGS

The present invention will be more fully understood and appreciated from the following detailed description, taken in conjunction with the drawings in which.

Figure 1:
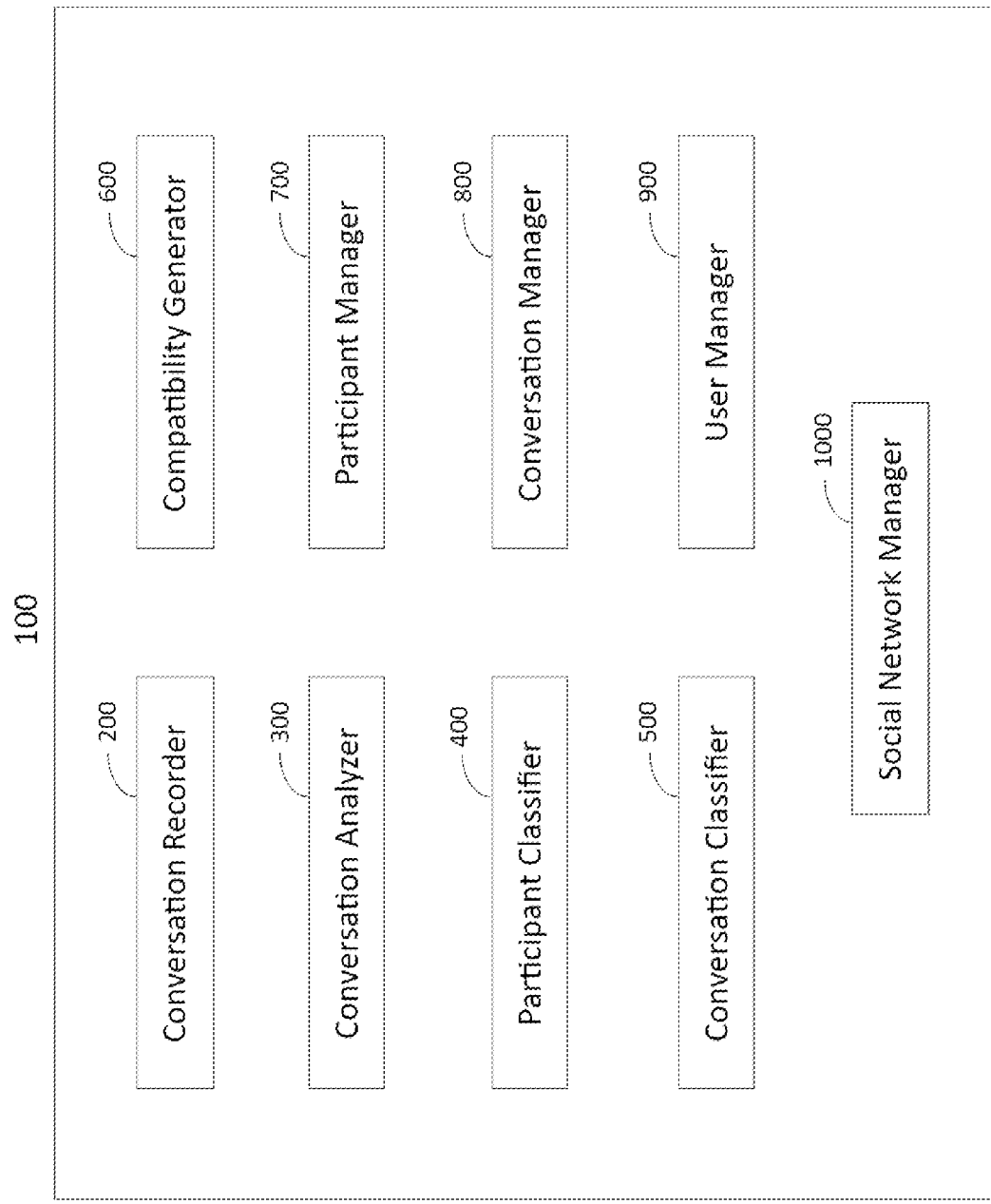
FIG. 1 is a simplified top-level architecture diagram of a conversational social network, in accordance with an embodiment of the present invention.

In the disclosure and figures, the following numbering scheme is used. Like numbered elements are similar but not necessarily identical.

TABLE I

Elements of Figures

| Reference Numeral | Element |
| --- | --- |
| 10-22 | user interface elements |
| 100 | conversational social network |
| 200 | conversation recorder |
| 201-203 | operations of conversation recorder |
| 250 | conversation database |
| 300 | conversation analyzer |
| 301-318 | operations of conversation analyzer |
| 350 | analysis database |
| 400 | participant classifier |
| 401-404 | operations of participant classifier |
| 450 | participant classification database |
| 500 | conversation classifier |
| 501-506 | operations of conversation classifier |
| 550 | conversation classification database |
| 600 | compatibility generator |
| 601-606 | operations of compatibility generator |
| 650 | compatibility database |
| 700 | participant manager |
| 701 | application programming interface |
| 702 | participant management engine |
| 703-728 | operations of participant manager |
| 800 | conversation manager |
| 801 | application programming interface |
| 802 | conversation management engine |
| 803-817 | operations of conversation manager |
| 850 | conversation management database |
| 860 | media bridge |
| 900 | user manager |
| 901 | application programming interface |
| 902 | user management engine |
| 903-908 | operations of user manager |
| 950 | User database |
| 1000 | social network manager |
| 1001 | application programming interface |
| 1002 | social network management engine |
| 1101-1111 | operations of social network manager |
| 1201-1210 | operations of social network manager |
| 1301-1312 | operations of social network manager |
| 1401-1410 | operations of social network manager |

DETAILED DESCRIPTION

For the purpose of clarity, the description of the invention hereinbelow is divided into sections as follows.

The first section describes how the present invention records the audio component of conversations.

The second section describes how the present invention analyzes the audio component of conversations and extracts certain attributes of the conversation and of participants in the conversations.

The third section describes how the present invention utilizes various machine learning techniques to divide participants into classes and clusters where the classes and clusters represent common sets of attributes.

The fourth section describes how the present invention utilizes various machine learning techniques to divide conversations into classes and clusters, where the classes and clusters represent common sets of attributes.

The fifth section describes how the present invention determines, based on the attributes, classes, and clusters determined in the earlier sections, which participants are likely to be compatible with each other in conversation, and which groups of participants are likely to be compatible for multi-party conversations.

The sixth section describes how the present invention finds, based on the compatibility information determined in the prior section, specific participants for one-on-one and multi-party conversations.

The seventh section describes how the present invention sets up conversations, adds people to conversations, removes people from conversations, and closes conversations.

The eighth section describes how the present invention manages users in a social network including managing friend requests and user ratings.

The ninth section describes how the present invention, based on aspects described in all the prior sections, allows people to interact conversationally in a social network.

Reference is made to FIG. 1, which is a simplified top-level architecture diagram of a conversational social network 100, in accordance with an embodiment of the present invention. FIG. 1 shows a simplified block diagram of the components of conversational social network 100.

Figure 2:
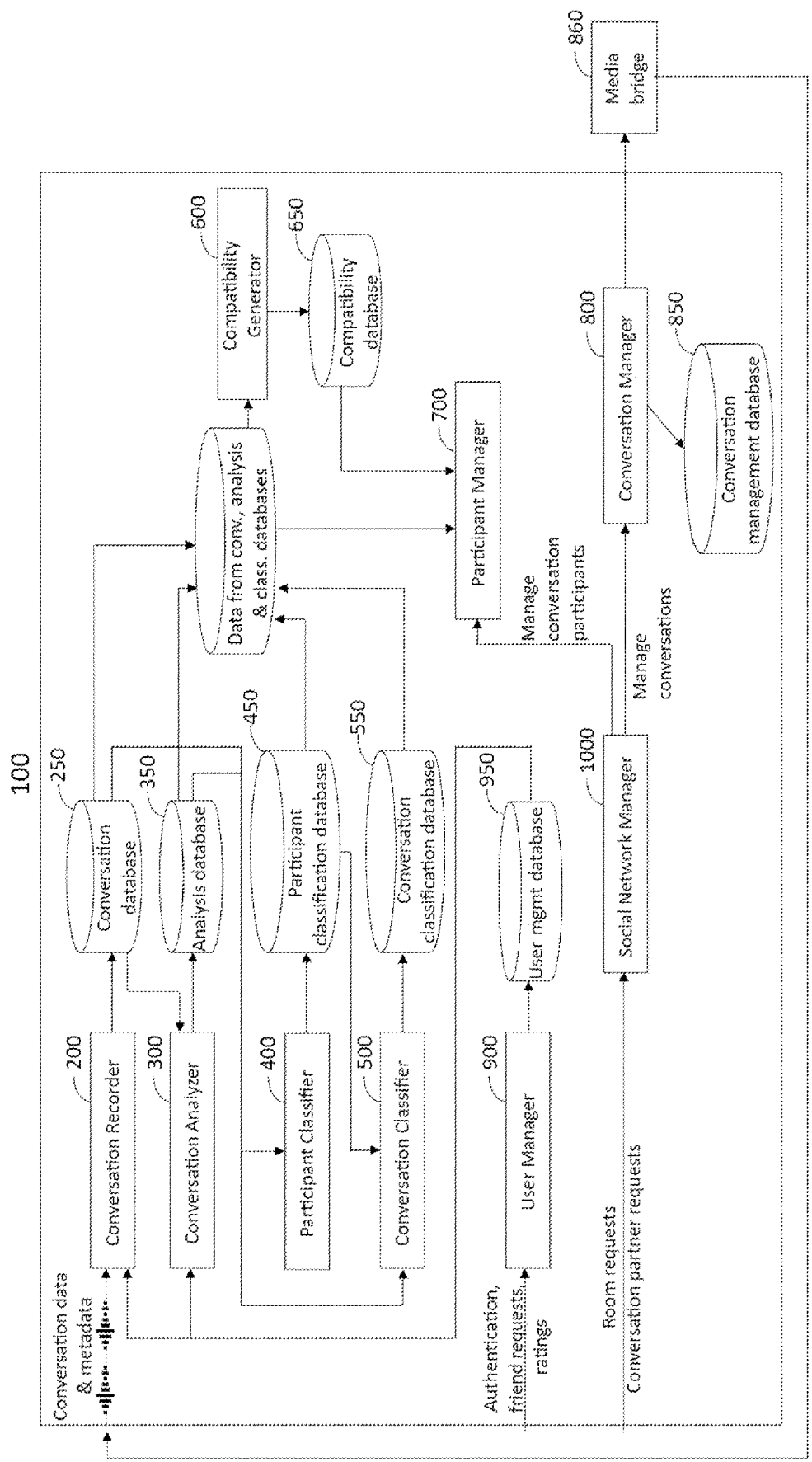
FIG. 2 is an additional simplified top-level architecture diagram of a conversational social network, in accordance with an embodiment of the present invention.

Reference is made to FIG. 2, which is an additional simplified top-level architecture diagram of conversational social network 100, and which includes inputs to, outputs from, and databases of the components of conversational social network 100.

Component 200 is a conversation recorder, which receives as input conversation audio, conversation video, and conversation metadata. Conversation recorder 200 generates additional metadata from the conversation and stores conversation audio and conversation metadata in conversation database 250.

Component 300 is a conversation analyzer, which receives as input conversation data and metadata such as that stored in conversation database 250. Conversation analyzer 300 performs analysis operations on the conversation and stores the results of the analyses in analysis database 350.

Component 400 is a participant classifier, which receives as input conversation metadata such as that stored in conversation database 250 and analysis database 350. Participant classifier 400 implements a set of machine learning operations in order to divide conversation participants into classes and clusters, and stores the class and cluster information in participant classification database 450.

Component 500 is a conversation classifier, which receives as input conversation metadata such as that stored in conversation database 250 and analysis database 350, and participant class and cluster information such as that stored in participant classification database 450. Conversation classifier 500 implements a set of machine learning operations in order to divide conversations into classes and clusters, and stores the class and cluster information in conversation classification database 550.

Component 600 is a compatibility generator, which receives as input conversation metadata and conversation class and cluster information such as that stored in conversation database 250, analysis database 350, participant classification database 450, and conversation classification database 550. Compatibility generator 600 determines, based on the input, which pairs of participants are likely to be compatible with each another, and which groups of participants are likely to be compatible with one another, and stores this compatibility information in compatibility database 650.

Component 700 is a participant manager, which receives requests to find participants for conversations, determines optimal participants based on data in compatibility database 650, and returns the selected participant or participants to the requestor. Participant manager 700 accepts multiple types of requests, including finding a compatible conversation partner for a designated participant, finding pairs of compatible partners, dividing a set of participants into multiple groups, and assigning a designated participant to one of a number of existing groups.

Component 800 is a conversation manager, which receives requests to set up conversations, add people to conversations, remove people from conversations, and close conversations. Requests to conversation manager 800 include identifying information about the designated participant or participants to add or remove. Conversation manager 800 performs the requested actions by interfacing with a media bridge such as media bridge 860, and stores information about conversations in conversation management database 850.

Component 900 is a user manager, which receives user requests such as signup, authentication, friend requests, and user ratings. User manager 900 performs the requested actions and stores relevant information in user database 950.

Component 1000 is a social network manager, which receives requests to have conversations, create rooms, and join rooms. Social network manager 1000 performs the requested actions by interfacing with participant manager 700 for selecting participants for conversations and rooms, and by interfacing with conversation manager 800 for setting up conversations and rooms and for adding participants to conversations and rooms.

The components shown in FIG. 1 and FIG. 2 are generally implemented in one or more server computers. The components typically interface with client applications such as mobile phone applications and personal computer applications.

The components which receive conversation audio data, video data, and metadata typically receive such data and metadata from internet protocol (IP) based audio systems and IP-based video systems.

It will be appreciated however by those skilled in the art that multiple systems and technologies exist for connecting people over audio and video calls, and that components of the present invention may beneficially receive audio data, video data, and metadata from any such system.

Figure 3:
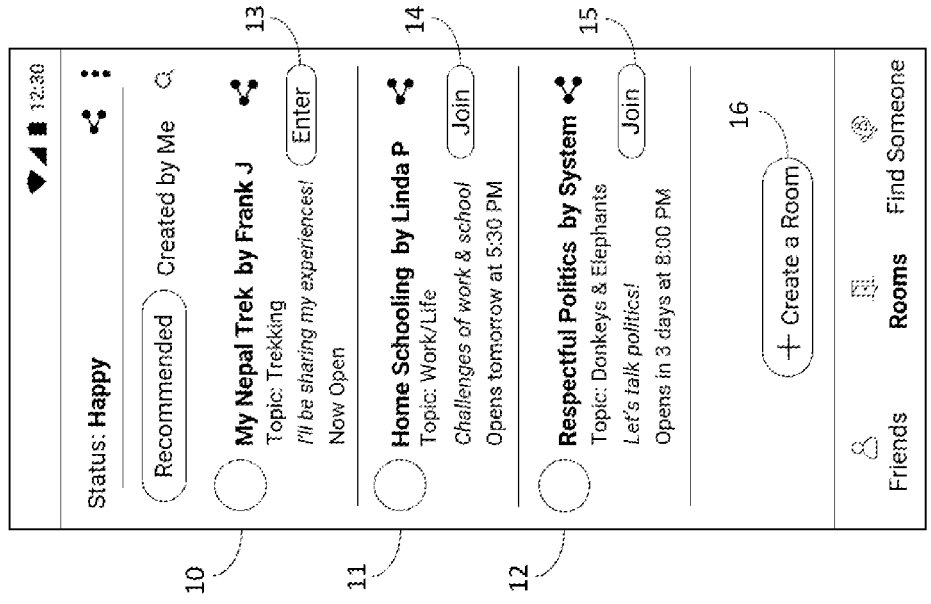
FIG. 3 is a schematic wireframe of a user interface screen of a conversational social network in accordance with an embodiment of the present invention.

Reference is made to FIG. 3, which is a schematic wireframe of a user interface screen of a conversational social network in accordance with an embodiment of the present invention. FIG. 3 illustrates how a user may, using an embodiment of the present invention, view a list of rooms, join a room, enter a room, and create his or her own room.

Shown in the central area of FIG. 3 is a list of rooms 10, 11, and 12, which the conversational social network has presented to the user, including room 10 to discuss trekking, room 11 to discuss home schooling, and room 12 to discuss politics. Each room shows a name of the room, a topic, a short description, and an opening time.

Adjacent to each room is a button that allows the user to either enter the room, in a case where the room is already open, or to join the room, in a case where the room is not yet open. Adjacent to room 10, which is currently open, is button 13 which allows the user to enter the room. Adjacent to rooms 11 and 12, which are not yet open, are buttons 14 and 15 which allow the user to indicate that he or she wishes to join the room when it opens.

When multiple users request to join a designated room, the conversational social network divides the users into room instances in an optimal manner as described hereinbelow.

When a user requests to join a room which is already open, the conversational social network places the user in the optimal room instance as described hereinbelow.

Also shown in FIG. 3 is button 16, which allows the user to create a new room, as described hereinbelow.

Figure 4:
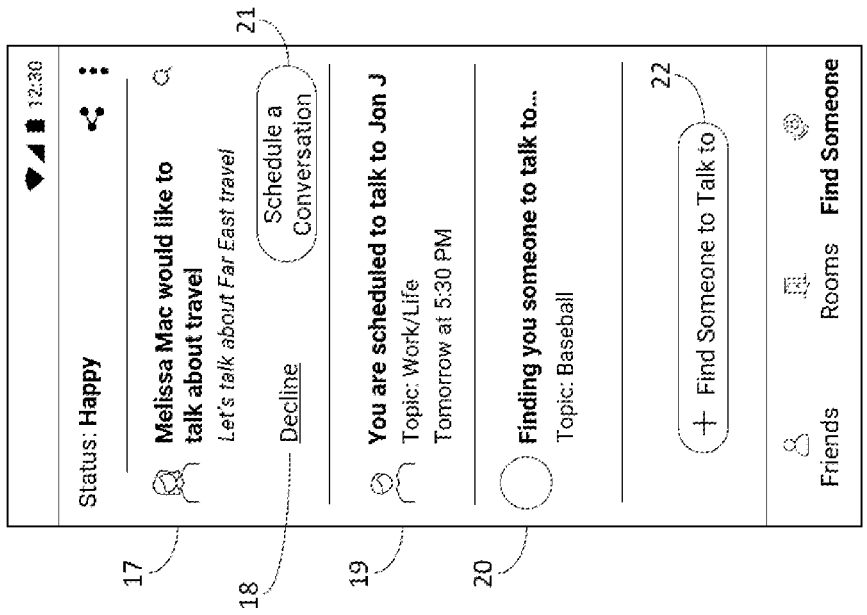
FIG. 4 is a schematic wireframe of a user interface screen of additional aspects of a conversational social network in accordance with an embodiment of the present invention.

Reference is made to FIG. 4, which is a schematic wireframe of a user interface screen of additional aspects of a conversational social network in accordance with an embodiment of the present invention. FIG. 4 illustrates how a user may, using an embodiment of the present invention, find a conversation partner and have a conversation.

Shown in FIG. 4 is a list of three conversation partners or potential partners for the user, indicated as elements 17, 18, and 19.

Element 17 is a potential conversation partner which the conversational social network is suggesting to the user, as described hereinbelow. Adjacent to conversation partner 17 is button 21, which allows the user to schedule a conversation with the suggested user, and button 18, which allows the user to decline the suggestion.

Element 19 is a conversation with a partner which has previously been scheduled, as described hereinbelow.

Element 20 shows the conversational social network attempting to identify a partner for a new conversation as described hereinbelow.

Also shown in FIG. 4 is button 22, which allows the user to request a new conversation with an unspecified person. The conversational social network identifies an optimal partner and places the users in a conversation as described hereinbelow.

Each of the components of conversational social network 100 is described in detail hereinbelow.

I. Conversation Recorder 200

Figure 5:
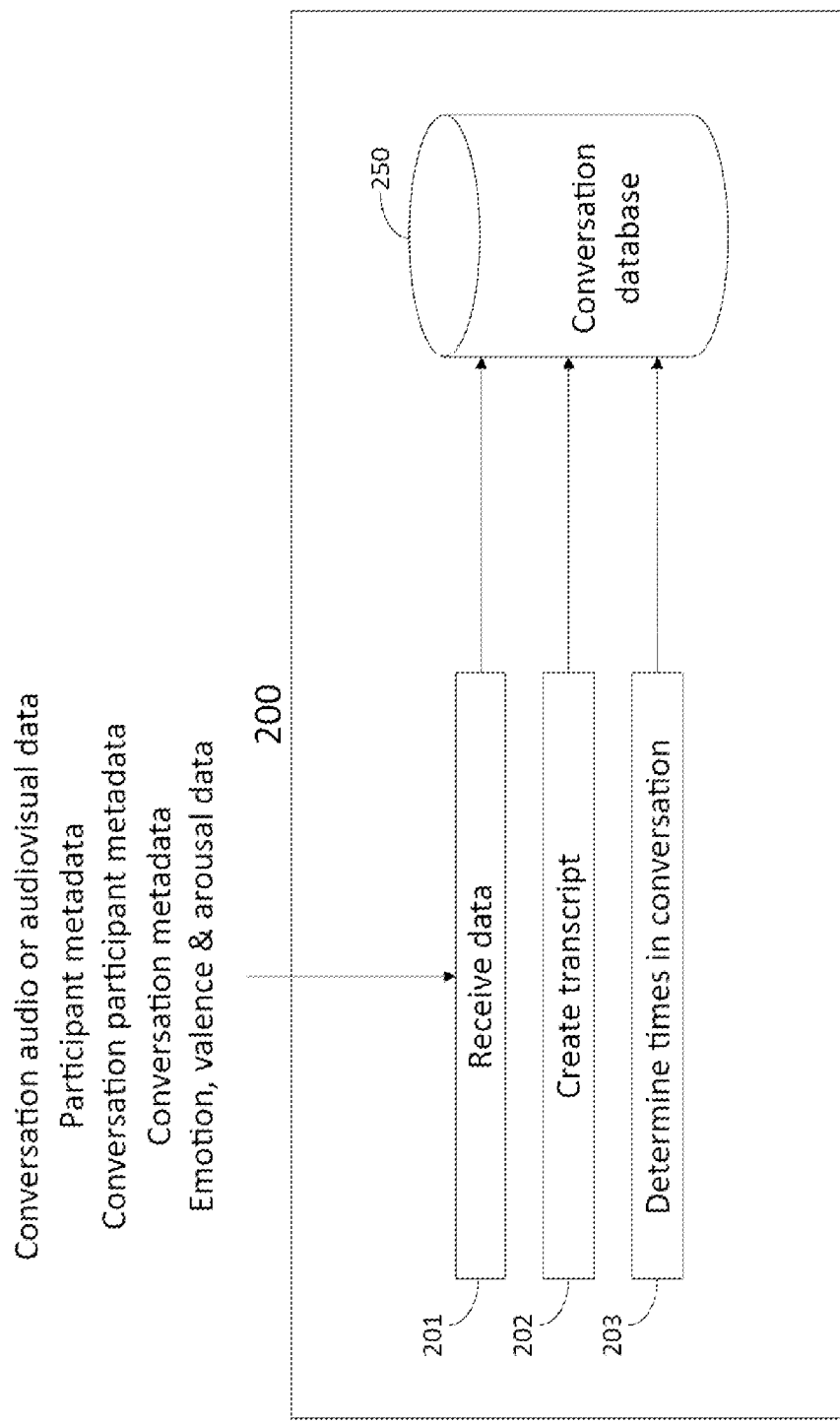
FIG. 5 is a high-level schematic diagram of a conversation recorder in accordance with an embodiment of the present invention.

Reference is made to FIG. 5, which is a high-level schematic diagram of a conversation recorder in accordance with an embodiment of the present invention. FIG. 5 incudes operations 201 through 203, and conversation database 250 which stores conversation data and metadata.

Conversation recorder 200 receives, as input, audio or audiovisual data and stores the audio component of the data in conversation database 250. Conversation recorder 200 additionally receives metadata and stores such received metadata in conversation database 250. Conversation recorder 200 further generates metadata based on audio data received and stores such generated metadata in conversation database 250.

At operation 201 conversation recorder 200 receives conversation data, participant metadata, conversation participant metadata, conversation metadata, and emotion data, and stores the audio portion of the received data, and the received metadata, in conversation database 250.

At operation 202 conversation recorder 200 creates a transcript from the received audio data and stores the transcript in conversation database 250.

At operation 203 conversation recorder 200 determines the amounts of times the participants spent in the conversation and stores these times in conversation database 250.

In the case of audiovisual data, conversation recorder 200 extracts the audio component of the data and stores only the audio. The audio data may be stored in its original format, or may be transcoded to a different format before storing. Audio formats, known as codecs, that are suitable for storing audio conversations include inter alia Opus, Vorbis, AMR, AAC and MP3.

In an embodiment of the present invention, conversation recorder 200 receives live data from a conversation that is ongoing, for example, from a Voice Over IP (VoIP) bridge.

In an additional embodiment of the present invention, conversation recorder 200 receives data from a conversation that occurred in the past.

Conversation data received by conversation recorder 200 may be from a conversation with two participants, and may be from a multi-participant conversation.

In a multi-participant conversation, participants may enter and leave the conversation multiple times. Thus a conversation does not in some cases include a fixed set of participants over its entire duration.

Conversation data received by conversation recorder 200 may be single-feed or multi-feed. In the case of single-feed data, the feed represents multiple members in a single conversation. In the case of multi-feed data, each feed represents the audio or audiovisual data for a single participant in a conversation. In aggregate, all the feeds together represent the entire conversation.

In an embodiment of the present invention, conversation recorder 200 receives participant metadata. Participant metadata represents information about a specific person participating in conversations, and includes inter alia (i) a unique identifier for the person, (ii) name, (iii) age, (iv) gender, (v) geographical location, and (vi) personality descriptors including inter alia (a) introvert, (b) extrovert.

In an embodiment of the present invention, conversation recorder 200 receives conversation participant metadata. Conversation participant metadata represents information about a specific person in a specific conversation and includes inter alia (i) the time or times the participant entered the conversation, and the time or times the participant left the conversation; (ii) a subjective evaluation by the participant of the nature of the conversation, including inter alia (a) enjoyable, (b) hostile, (c) boring, (d) unenjoyable; (iii) a subjective quality score for the conversation determined by the participant; (iv) a subjective evaluation by the participant of the emotional state of the participant during the conversation including inter alia (a) happy, (b) sad, (c) angry, (d) irritated, (e) calm, (f) excited; (v) a third-party evaluation of the emotional state of the participant during the conversation; (vi) a transcript of the participant's spoken words; (vii) subjective likability ratings given to the participant by other conversation participants; and (viii) friend requests sent to the participant by other conversation participants.

In an embodiment of the present invention, conversation recorder 200 receives conversation metadata. Conversation metadata represents information about the conversation as a whole, and includes inter alia (i) the time the conversation took place, (ii) the topic of the conversation, (iii) a subjective evaluation by a third party of the nature of the conversation, (iv) a subjective quality score for the conversation by a third party, and (v) the duration of the conversation.

In an embodiment of the present invention, conversation recorder 200 receives participant metadata, conversation participant metadata, and conversation metadata together with the conversation data.

In an alternative embodiment of the present invention, conversation recorder 200 receives such metadata separately from the conversation data, where each metadata element contains an identifier whereby it is associated with the appropriate conversation.

In an embodiment of the present invention conversation recorder 200 creates a transcript of the spoken words of each participant in the conversation, and maintains this transcript as conversation metadata. It will be appreciated by those skilled in the art that a variety of well-known voice recognition algorithms may be implemented to create such a transcript.

In an embodiment of the present invention conversation recorder 200 determines the time or times that each participant joined the conversation and the time or times that each participant left the conversation, rather than receiving this information as conversation metadata.

Conversation recorder 200 determines for each participant, based on the time or times the participant entered the conversation and the time or times the participant left the conversation, the amount of time the participant spent in the conversation, and stores this information as conversation participant metadata.

In the field of psychology, the term "valence" refers to the categorization of emotions into positive emotions, such as joy or happiness, and negative emotions such as anger or fear. The term "arousal" refers to the level of intensity of an emotion.

In an embodiment of the present invention, conversation recorder 200 receives information regarding the emotions expressed by participants in a conversation, the valence of the emotions, and the arousal level, and maintains this information as conversation metadata.

Conversation recorder 200 associates each metadata element so received or generated with the relevant conversation and participant, and stores the metadata in conversation database 250.

II. Conversation Analyzer 300

Figure 6:
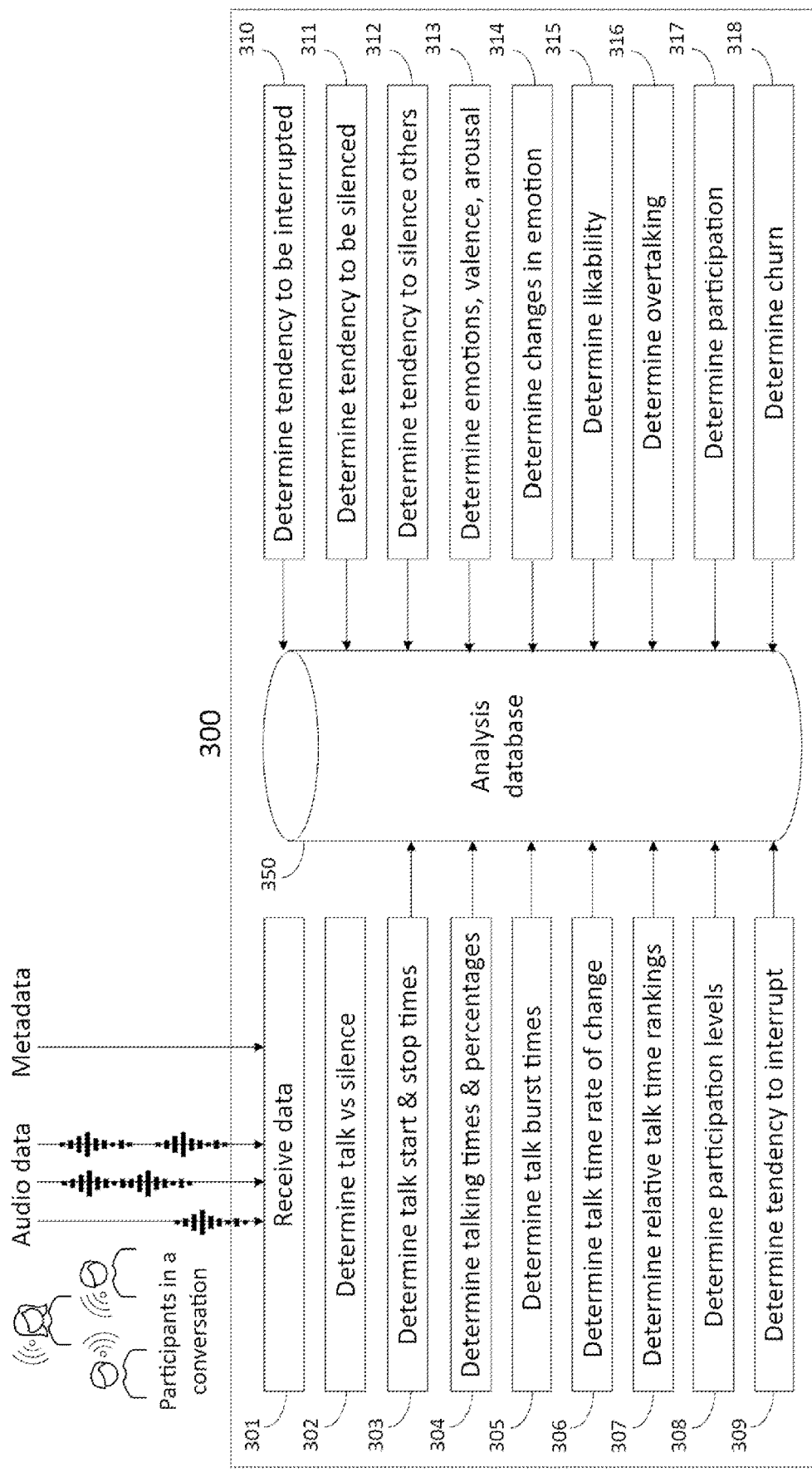
FIG. 6 is a high-level schematic diagram of a conversation analyzer, in accordance with an embodiment of the present invention.

Reference is made to FIG. 6, which is a high-level schematic diagram of a conversation analyzer, in accordance with an embodiment of the present invention. FIG. 6 includes analysis operations 301 through 318, and analysis database 350 which stores analysis results.

Conversation analyzer 300 performs a set of analyses on conversations, such as those recorded by conversation recorder 200, and extracts certain attributes of the conversations, as will be described further hereinbelow. Attributes extracted include inter alia non-verbal attributes. Attributes extracted include both attributes of the conversation as a whole as well as attributes of the individual participants in the conversation.

Conversation analyzer 300 determines the following attributes for each participant in a conversation, as described further hereinbelow: (i) times in the conversation during which the participant is talking, (ii) talk burst times, (iii) talk time rate of change during the conversation, (iv) talk time ranking among all conversation participants, (v) participation level, (vi) tendency to interrupt other participants, (vii) tendency to be interrupted by other participants, (viii) tendency to stop talking when interrupted by others, i.e., to be silenced by others, (ix) tendency to cause others to stop talking when interrupting them, i.e., to silence others, (x) emotional state of the participant over the course of the call, (xi) change in emotional state of the participant over the course of the call, and (xii) likability of the participant.

At operation 301 conversation analyzer 300 receives data regarding a conversation, such as data stored in conversation database 250 by conversation recorder 200, including (i) the audio portion of the conversation, (ii) metadata regarding the conversation, and (iii) metadata regarding participants in the conversation.

In an embodiment of the present invention at operation 301 conversation analyzer 300 additionally receives friend request and likability rating information for conversation participants, where such data is related to the participants but is not related specifically to the designated conversation, such as information stored in user database 950 as described hereinbelow.

Conversation analyzer 300 receives data regarding conversations that are in the past; i.e., that are already completed, and also receives data regarding conversations that are ongoing. In the case of an ongoing conversation, conversation analyzer 300 may receive data multiple times over the course of the conversation, in which case it performs the analyses described herein multiple times, and updates the information stored in analysis database 350 as analyses are performed.

In the operations described hereinbelow, conversation analyzer 300 may break a conversation into multiple segments and perform its analyses and determinations on each segment independently, as if the segment were an entire conversation.

It will be appreciated by those skilled in the art that such segmenting may be useful when a conversation is long and participants join and leave the conversation multiple times.

At operation 302 conversation analyzer 300 determines, for each conversation participant, when the participant is talking and when the participant is silent. This determination is made by performing a power analysis, such as a root mean squared (RMS) analysis, on the audio waveform. It will be appreciated by those skilled in the art that other methods of determining when participants are talking are well-known and that various methods may be used.

At operation 303 conversation analyzer 300 creates start/stop timestamps for each time the participant began talking and stopped talking, and stores these timestamp pairs in analysis database 350.

At operation 304 conversation analyzer 300 determines, based on the start/stop timestamps, a talking time and a talking time percentage for every participant, and stores these percentages in analysis database 350. The talking time is the total amount of time the participant was talking during the time the participant was in the conversation. The talking time percentage is calculated by dividing the total time in which the participant was talking by the total time the participant participated in the conversation.

At operation 305 conversation analyzer 300 determines, for each conversation participant, the lengths of time between each talk start time and stop time over the course of the conversation, and the average of these lengths of time. Conversation analyzer stores this information, referred to as talk burst time, in analysis database 350.

At operation 306 conversation analyzer 300 determines, for each conversation participant, the rate of change in talk time over the course of the conversation. For example, if during the first third of the conversation a particular participant talked ten percent of the time, in the middle third of the conversation twenty percent of the time, and in the last third of the conversation thirty percent of the time, the participant's talking time would be classified as "increasing". Other classifications include "steady", "decreasing", and "random". Conversation analyzer 300 stores the rate of change classification in analysis database 350.

At operation 307 conversation analyzer 300 determines a relative talk time rank for every participant, and stores these rankings in analysis database 350. The talk time rank is calculated by comparing the talking time of each participant, during the time in which the participant participated in the conversation, with the talking times of all other participants during the same time period.

In embodiments of the present invention, different numeric rankings may be utilized to express the talk time rank. An example of such a ranking is a scale of one to ten, where a participant who talked the least during the given time period is determined to have a relative talk time of 1, and a participant who talked the most during the given time period is determined to have a relative talk time of 10.

At operation 308 conversation analyzer 300 determines a participation level for each participant. Conversation analyzer 300 evaluates the times during which each participant was talking and determines for each participant whether that participant (i) did not speak or spoke very little; i.e. did not actively participate, (ii) actively participated occasionally, or (iii) actively participated frequently. Conversation analyzer 300 represents this determination as a numeric value, and stores this participation level in analysis database 350.

In an embodiment of the present invention, conversation analyzer 300 maintains a talk-time threshold for occasional participation and a talk-time threshold for frequent participation. A participant who surpasses the threshold for occasional participation but not the threshold for frequent participation is determined to have participated occasionally. A participant who surpasses the threshold for frequent participation is determined to have participated frequently. The talk-time thresholds are represented as percentages of the total length of time the participant was in the conversation.

In an alternative embodiment of the present invention, the talk-time thresholds are represented as percentages of the aggregate total talking time of all participants in the conversation during the time the participant was in the conversation.

In a further alternative embodiment of the present invention, conversation analyzer 300 determines participation on a continuum rather than as a discrete set of participation levels. In this embodiment conversation analyzer 300 stores in analysis database 350 each participant's talk time relative to the total length of time the participant was in the conversation, rather than a determination that the participant participated little, occasionally, or frequently.

As an illustrative example, conversation analyzer 300 may determine that, over the course of a ten minute conversation in which seven people participated, the talk time of each participant is as follows: (i) Participant A, 1 minute, (ii) Participant B, 1.5 minutes, (iii) Participant C, 3 minutes, (iv) Participant D, 4 minutes, (v) Participant E, 4 minutes, (vi) Participant F, 5 minutes, and (vii) Participant G, 0 minutes. The total talking time is thus 18.5 minutes.

In this example, in the first embodiment, the threshold for occasional participation is 5% of conversation length, i.e. 0.5 minutes, and the threshold for frequent participation is 20% of the conversation, i.e. 2 minutes. Conversation analyzer 300 would thus determine that participant G did not actively participate, participants A and B participated occasionally, and participants C, D, E, and F participated frequently.

In this example, in the alternative embodiment, the threshold for occasional participation is 2% of the total talking time, i.e. 0.36 minutes, and the threshold for frequent participation is 8% of the total talking time, i.e. 1.44 minutes. Conversation analyzer 300 would thus determine that participant G did not actively participate, participant A participated occasionally, and participants B, C, D, E, and F participated frequently.

At operation 309 conversation analyzer 300 determines, for each conversation participant, the participant's tendency to interrupt other participants. A participant is considered to be interrupting when he or she begins talking while one or more other participants are talking. Conversation analyzer 300 calculates the number of times each participant interrupts others as a percentage of total number of times that participant began talking over the course of the conversation, and stores this interrupting percentage in analysis database 350.

At operation 310 conversation analyzer 300 determines, for each conversation participant, the participant's tendency to be interrupted by others. A participant is considered to have been interrupted when he or she is talking and one or more other participants begins talking. Conversation analyzer 300 calculates the number of times each participant was interrupted as compared to the total talking time of the participant, and stores this information in analysis database 350.

At operation 311 conversation analyzer 300 determines, for each conversation participant, the participant's tendency to stop talking when interrupted. A participant is considered to have stopped talking when interrupted if he or she is interrupted by one or more other participants, and stops talking within a predetermined number of milliseconds of being interrupted. Conversation analyzer 300 calculates the number of times each participant stopped talking when interrupted as compared to the total talking time of the participant, and stores this information in analysis database 350.

Conversation analyzer 300 further calculates the number of times each participant stopped talking when interrupted as compared to the total number of times the participant was interrupted in the conversation, and stores this percentage in analysis database 350.

At operation 312 conversation analyzer 300 determines, for each conversation participant, the participant's tendency to cause others to stop talking when interrupting them. A participant is considered to have caused others to stop talking when he or she interrupts one or more other participants, and the one or more other participants all stop talking within a predetermined number of milliseconds of being interrupted. Conversation analyzer 300 calculates the number of times each participant caused others to stop talking by interrupting them, as compared to the total talking time of the participant, and stores this information in analysis database 350.

Conversation analyzer 300 further calculates the number of times each participant caused others to stop talking by interrupting them, as a percentage of the total number of times the participant interrupted others in the conversation, and stores this percentage in analysis database 350.

At operation 313 conversation analyzer 300 determines, for each conversation participant, the emotions expressed by the participant over the course of the conversation, the emotional valence, and the arousal level. Emotions expressed include inter alia (a) happiness, (b) sadness, (c) anger, (d) irritation, (e) calm, and (f) excitement. Conversation analyzer 300 then stores the emotions, valence, and arousal in analysis database 350.

At operation 314 conversation analyzer 300 determines, for each conversation participant, changes in emotional state over the course of the conversation. If a participant began the conversation with negative emotions, such as anger or irritation, and changed over the course of the call to positive emotions, such as happiness or excitement, this is categorized as a positive change in emotion. If the reverse occurred, this is categorized as a negative change. If the participant's emotional state was unchanged over the course of the conversation this is categorized as no change. If the participant's emotional state changed over the course of the conversation but with neither a positive nor a negative trend, this is categorized as undefined. Conversation analyzer 300 then stores these changes in emotional state in analysis database 350.

At operation 315 conversation analyzer 300 determines, for each conversation participant, a likability score for the participant and stores these likability scores in analysis database 350. The score is determined based on the number of friend requests the participant has received and the likability ratings the participant received.

Each friend request is assigned a numeric value, such as 100.

Each likability rating is assigned a numeric value, such as 0 for dislikable, 50 for neutral, and 100 for likable.

In an embodiment of the present invention, the likability score of a designated participant is determined by calculating the average of all likability ratings and all friend requests received by the participant.

As an illustrative example, a designated participant may have been rated once as "likable" and once as "neutral", and received one friend request. In this example "dislikable" is assigned 0, "neutral" is assigned 50, likable is assigned 100, and a friend request is assigned 100. The total likability score is thus calculated as the average of 50 (neutral), 100 (likable), and 100 (friend request), which is approximately 83. If the participant later receives an additional friend request, and is additionally later rated "unlikable", the score is recalculated as the average of 0, 50, 100, 100, and 100, which is 70.

It will be appreciated by those skilled in the art that the calculation described hereinabove for determining likability scores represents an arithmetical calculation on sets of input parameters. As such, any number of different arithmetical or mathematical functions may be used to equal or greater effect to those described hereinabove.

After performing analyses on conversation participants as described hereinabove, conversation analyzer 300 determines the following attributes for the conversation as a whole: (i) an overtalking score, (ii) a participation score, and (iii) a churn score.

At operation 316 conversation analyzer 300 evaluates the times during which each participant was talking, and determines the amounts of time over the course of the conversation when only one participant was talking, when multiple participants were talking at the same time, and when there was silence. This information is segmented by number of people talking. Conversation analyzer 300 uses this information to determine an overtalking score for the conversation. Conversation analyzer 300 then stores these overtalking score in analysis database 350.

As an illustrative example, conversation analyzer 300 may determine that over the course of a ten minute conversation with six participants there were five minutes with only one person talking, two minutes with two people talking at the same time, one and a half minutes with three people talking at the same time, one minute with four people talking at the same time, and thirty seconds of silence.

In an embodiment of the present invention the overtalking score is calculated by dividing the total participant-talking time by the length of the conversation. In the foregoing example the total participant-talking time is 17.5 minutes, calculated as follows: 1 person times 5 minutes plus 2 people times 2 minutes plus 3 people times 1.5 minutes plus 4 people times 1 minute. This is represented arithmetically as 1×5+2×2+3×1.5+4×1=17.5. Dividing this value by the length of the conversation gives an overtalking score of 1.75.

In an alternative embodiment of the present invention, each distinct number of people talking at the same time is not given equal weight, but rather greater weights are given to higher numbers of people talking at the same time. As an illustrative example, consider two scenarios for a two-minute conversation with two participants. In the first scenario the two participants talk at the same time for one minute, and are silent for one minute. In the second scenario the two participants each talk for one minute, but alternate such that there is no overtalking and no silence. In an embodiment where each distinct number of people talking is given equal weight, both scenarios result in an overtalking score of 1. In an embodiment where two people talking at the same time is given greater weight than one person talking, the first scenario results in a higher overtalking score than the second scenario. In this embodiment increasing numbers of people talking at the same time may be given successively increasing weights.

At operation 317 conversation analyzer 300 determines a participation score for the conversation. The score is determined by calculating an average of the participation levels of all participants in the conversation. Conversation analyzer 300 then stores this conversation participation score in analysis database 350.

In an embodiment of the present invention the calculation of the average of the participation levels of the participants disregards participants who were silent during the conversation.

In an alternative embodiment of the present invention, the calculation of the average of the participation levels of the participants disregards participants who did not actively participate in the conversation.

At operation 318 conversation analyzer 300 determines a churn score for the conversation. A conversation in which people leave and join frequently is considered to have a high rate of churn, and conversely a conversation where the set of participants is stable is considered to have a low rate of churn. Conversation analyzer 300 then stores this churn score in analysis database 350.

As users join and leave the conversation, conversation analyzer 300 maintains a running counter of "leave events". The counter is set to zero at the start of the conversation, and every time a participant leaves the conversation the counter is incremented. A specified participant may join and leave the conversation multiple times, and in this case the counter is incremented each time the participant leaves.

Conversation analyzer 300 additionally maintains a running counter of "churn events". The counter is set to zero at the start of the conversation. When a user joins the conversation, conversation analyzer 300 checks the value of the leave counter. If the leave counter is more than zero, it is decremented and the churn counter is incremented. If the leave counter is zero, it is not changed and the churn counter is also not changed.

Conversation analyzer 300 determines the churn score by dividing the value of the churn counter by the length of the conversation.

In an alternative embodiment of the present invention, the churn score is inversely weighted by the average number of people in the conversation. Thus in two conversations of the same length where the churn counters are the same, the conversation with the greater number of participants will have a lower churn score.

Conversation analyzer 300 repeats for multiple conversations the evaluations and determinations as described hereinabove. In some cases different conversations may include disparate sets of participants; in other cases multiple conversations may include identical sets of participants, and in yet other cases multiple conversations may include a combination of identical and disparate participants. Conversation analyzer 300 may thus determine and store information regarding the same participant multiple times across multiple conversations. Such information is maintained separately for each conversation and stored separately in analysis database 350. In an embodiment of the present invention, such data may additionally be aggregated by user across multiple conversations and additionally stored in analysis database 350 in aggregated form.

Certain attributes of a conversation participant, when aggregated over multiple conversations, are averaged over the conversations analyzed. As an illustrative example, when analyzing a participant's talk time ranking over multiple conversations, the ranking in all conversations is averaged, and the average ranking is stored in analysis database 350.

Other attributes of a conversation participant, when aggregated over multiple conversations, are added rather than averaged. As an illustrative example, when analyzing a participant's likability score across multiple conversations, the aggregate likability score of the participant will be incremented for every conversation in which the participant is determined to be likable.

In embodiments of the present invention, conversation analyzer 300 evaluates only subsets of the attributes described in operations 302 through 318. It will be appreciated by those skilled in the art that the more attributes that are analyzed, the more knowledge may be derived, but that even a subset of analyzed attributes may be useful in carrying out the various analyses performed by components of the present invention.

III. Participant Classifier 400

In the field of machine learning, "Classification" is the process of receiving, as input, a set of discrete entities and attributes of the entities, and creating, as output, a breakdown of the entities into a set of known "Classes" based on the attributes.

A related technique in the field of machine learning is "Clustering". Clustering is the process of receiving, as input, a set of discrete entities and attributes of the entities, and creating, as output, a breakdown of the entities into groups with similar attributes, where the attributes of the groups are not known in advance.

In an embodiment of the present invention the classification and clustering operations described hereinbelow are performed using a neural network.

It will be appreciated by those skilled in the art that a number of different neural network architectures may be used in the classification and clustering operations, including inter alia multi-layer perceptron network, recurrent neural network, and convolutional neural network.

Figure 7:
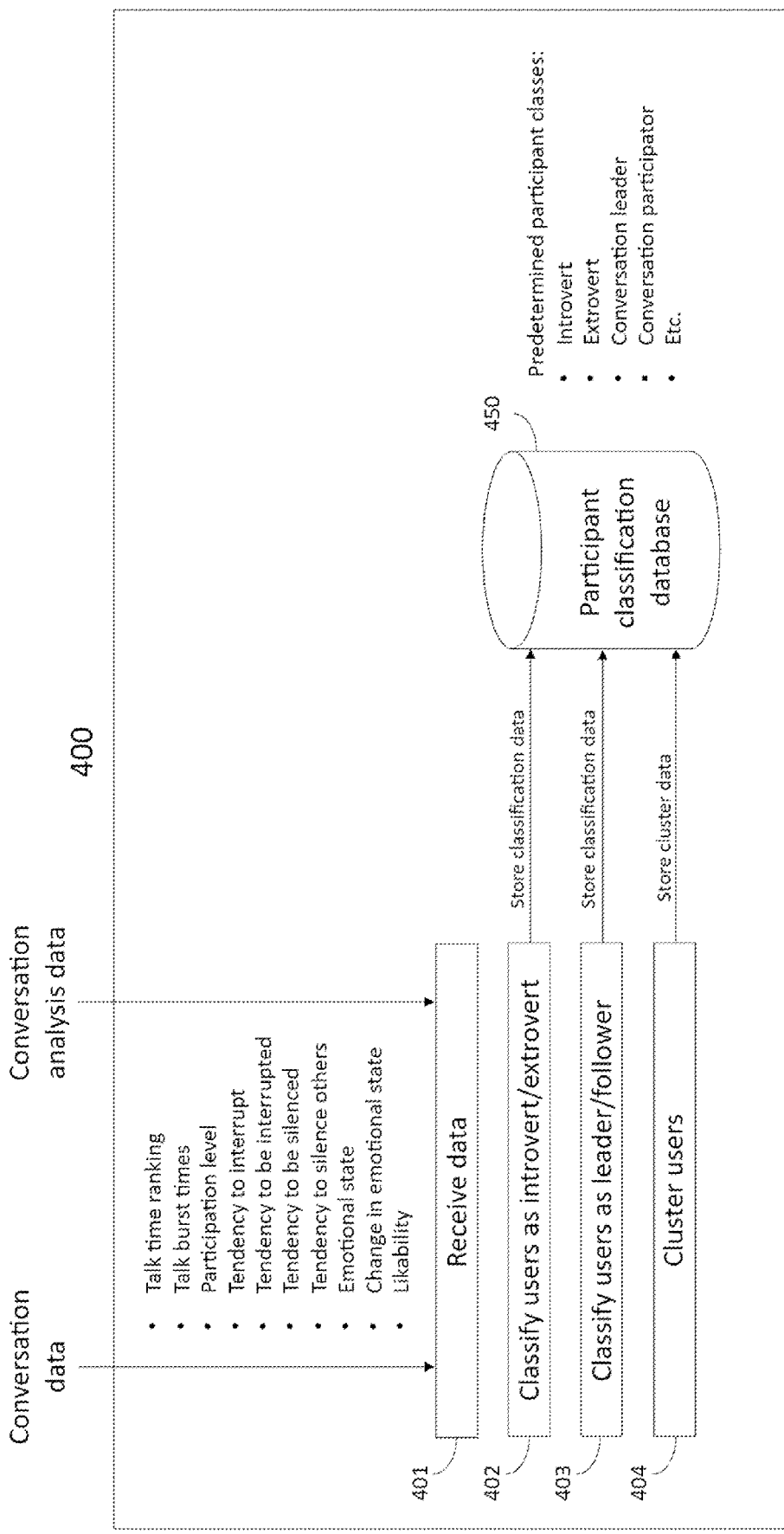
FIG. 7 is a high-level schematic diagram of a participant classifier, in accordance with an embodiment of the present invention.

Reference is made to FIG. 7, which is a high-level schematic diagram of a participant classifier, in accordance with an embodiment of the present invention. FIG. 7 contains analysis operations 401 through 404, and participant classification database 450 which stores classification data.

Participant classifier 400 performs classification and clustering on participants in conversations, and stores the resulting classifications and clusters in participant classification database 450.

At operation 401 participant classifier receives data regarding participants in a conversation, such as data stored in conversation database 250 by conversation recorder 200 and data stored in analysis database 350 by conversation analyzer 300.

Participant classifier 400 maintains a predetermined set of participant classes, which includes inter alia (i) introvert, (ii) extrovert, (iii) conversation leader, and (iv) conversation participator.

At operation 402 participant classifier 400 evaluates the talk time ranking and tendency to interrupt for a given participant in the conversation and classifies the participant as introvert or extrovert. If the participant is more than a pre-determined amount below the mean talk time ranking of all conversation participants, and more than a pre-determined amount below the mean tendency to interrupt of all conversation participants, the participant is classified as introvert. If the participant is more than a pre-determined amount above the mean talk time ranking of all conversation participants and more than a pre-determined amount above the mean tendency to interrupt of all conversation participants, the participant is classified as extrovert. If the participant is neither more than the predetermined amount above nor more than the predetermined amount below the mean talk time ranking or mean tendency to interrupt, the participant is classified as neither introvert nor extrovert.

In an alternative embodiment of the present invention, participant classifier 400 classifies the participant on an introvert/extrovert continuum, rather than making a determination that the participant is either an introvert or an extrovert or neither. In this embodiment participant classifier 400 evaluates the talk time and tendency to interrupt of the participant as compared to all other participants in the conversation, and creates a ranking score. This score is typically expressed as a percentage value, for example "60% extrovert", where the participant with the lowest rank is considered 0% and the participant with the highest rank is considered 100%.

As an illustrative example, in a conversation with seven participants participant classifier may determine that the given participant's talk time is more than that of two other participants and less than that of four other participants, and that the given participant's tendency to interrupt is greater than that of three other participants and less than that of three other participants. In this case the participant would be given a score of 33% on a talk time scale and 50% on the tendency to interrupt scale. Averaging these two scores gives a final ranking of "42% extrovert".

At operation 403 participant classifier 400 evaluates the talk burst times, talk time ranking, tendency to interrupt, and tendency to cause others to stop talking when interrupted for a given participant in the conversation and classifies the participant as conversation leader or conversation participator. If the participant is more than a pre-determined amount above the mean of all conversation participants for these attributes, the participant is classified as a conversation leader. If the participant is more than a pre-determined amount below the mean of all conversation participants for these attributes, the participant is classified as a conversation participator.

In an alternative embodiment of the present invention, participant classifier 400 classifies the participant on a leader/participator continuum, rather than making a determination that the participant is either a conversation leader or conversation participator or neither. In this embodiment participant classifier 400 evaluates the talk burst times, talk time ranking, tendency to interrupt, and tendency to cause others to stop talking when interrupted by the participant as compared to all other participants in the conversation, and creates a ranking score. This score is typically expressed as a percentage value, for example "60% conversation leader", where the participant with the lowest rank is considered 0% and the participant with the highest rank is considered 100%.

The pre-determined amounts referenced in operations 402 and 403 may be fixed numeric amounts or may be a statistical measure such as, for example, one standard deviation from the mean.

At operation 404 participant classifier 400 evaluates the conversation participant attributes received at operation 401 and performs a clustering process. The clustering process evaluates the attributes received and creates groups of participants where each group shares a common set of attribute values. Each such group represents a participant cluster.

As an illustrative example, participant classifier 400 may discover that a group of participants all share the following attributes: (i) a positive emotional state during conversations, (ii) a high average talk time ranking, (iii) a high tendency to stop talking when interrupted, (iv) a high likability score. Participant classifier 400 will thus create a cluster of these attributes, and associate with the cluster all those participants who share the attributes.

It will be appreciated by those skilled in the art that automated clustering is useful for finding sets of users with common attributes. In the above illustrative example, the cluster may represent participants who are engaging, polite and dominant in conversations. It will be further appreciated that people in this cluster may represent enjoyable conversation partners.

At each of operations 402 through 404, participant classifier 400 stores classification and cluster data as generated in the respective operations in participant classification database 450.

As participant classifier 400 receives information regarding additional conversations, it re-classifies and re-clusters the participants based on the aggregate of the information from all the conversations.

It will be appreciated by those skilled in the art that the more conversations evaluated by participant classifier 400, the more accurate and more useful the classifying and clustering will be. Thus over time, after evaluating multiple conversations with multiple participants, participant classifier 400 builds up an accurate classification of participants into one or more of the predetermined classes, and builds up an accurate set of clusters.

IV. Conversation Classifier 500

Figure 8:
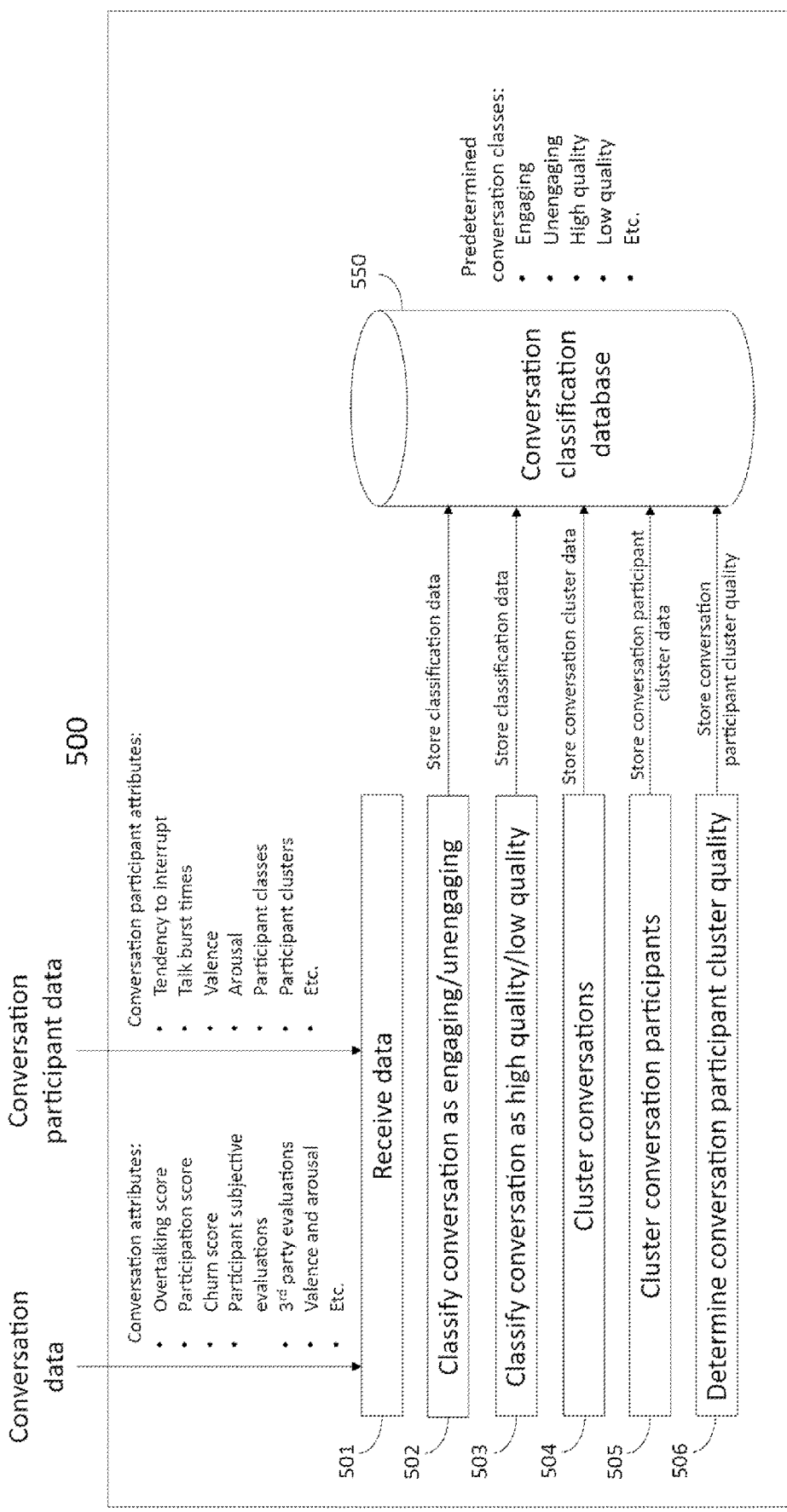
FIG. 8 is a high-level schematic diagram of a conversation classifier, in accordance with an embodiment of the present invention.

Reference is made to FIG. 8, which is a high-level schematic diagram of a conversation classifier, in accordance with an embodiment of the present invention. FIG. 8 includes analysis operations 501 through 506, and conversation classification database 550 which stores classification data.

Conversation classifier 500 performs classification and clustering on conversations, and stores the resulting classifications and clusters in conversation classification database 550.

The classification and clustering are performed on the one hand at the level of attributes of conversations as a whole. There are thus generated classifications of conversations and clusters of conversations. The clustering is further performed at the level of the attributes of the participants in the conversations. There are thus further created clusters of conversation member attributes.

At operation 501 conversation classifier 500 receives data regarding conversations and regarding participants in the conversations, such as data stored in conversation database 250 by conversation recorder 200, data stored in analysis database 350 by conversation analyzer 300, and data stored in participant classification database 450 by participant classifier 400.

Conversation classifier 500 maintains a predetermined set of conversation classes, which includes inter alia (i) engaging, (ii) unengaging, (iii) high quality, and (iv) low quality.

At operation 502 conversation classifier 500 evaluates one or more of the following attributes of a designated conversation: (i) the overtalking score of the conversation, (ii) the participation score of the conversation, (iii) the churn score of the conversation, (iv) the subjective evaluations of the conversation by conversation participants, (v) the subjective evaluations of the conversation by third parties, and (vi) the arousal level and valence expressed by conversation participants.

If the conversation meets the following criteria, it is classified as engaging: (i) the overtalking score is above a certain percentile threshold as compared with the overtalking scores of all analyzed conversations, (ii) more than a specified percentage of the conversation participants were determined to have actively participated in the conversation, and (iii) the churn score of the conversation is below a specified percentile threshold as compared with the churn scores of all analyzed conversations.

If the conversation meets the following criteria, it is classified as unengaging: (i) the overtalking score is below a certain percentile threshold as compared to the overtalking scores of all analyzed conversations, (ii) less than a specified percentage of the conversation participants were determined to have actively participated in the conversation, and (iii) the churn score of the conversation is above a specified percentile threshold as compared with the churn scores of all analyzed conversations.

At operation 503 conversation classifier 500 evaluates the churn score of a designated conversation, the subjective evaluations of the conversation by the conversation participants, and the subjective evaluations of the conversation by third parties if such evaluations were received, and determines a quality level for the conversation. The determination is made by calculating an average of values evaluated. In this calculation the inverse of the churn score is used in the determination; thus a high churn score lowers the quality classification of the conversation and a low churn score raises the quality classification of the conversation.

In an embodiment of the present invention conversation classifier 500 classifies the conversation as either subjectively high quality, subjectively low quality, or subjectively neither high nor low quality, based on threshold levels for the respective quality levels.

In an alternative embodiment of the present invention conversation classifier 500 classifies the conversation on a quality continuum rather than as discrete quality levels. In this embodiment the quality score is determined based on the calculated average of the values evaluated.

At operation 504 conversation classifier 500 evaluates the conversation attributes received at operation 501 for multiple conversations and performs a clustering process on the conversations. The process evaluates the attributes received and creates groups of conversations where each group shares a common set of attribute values. Each such group represents a conversation cluster.

As an illustrative example, conversation classifier 500 may discover that a group of conversations all share the following attributes: (i) a low overtalking score, (ii) a high participation level for a majority of conversation participants, (iii) a low churn score, (iv) a positive valence, and (v) a medium level of average arousal. Conversation classifier 500 will thus create a cluster of these attributes and associate with the cluster all those conversations which share the attributes.

It will be appreciated by those skilled in the art that a cluster such as in the above example includes conversations that are likely to be considered enjoyable by their participants, and that other clusters may include conversations considered less enjoyable or unenjoyable.

At operation 505 conversation classifier 500 evaluates the conversation participant attributes received at operation 501 for multiple conversations and performs a clustering process on the conversation participant attributes. The process evaluates the attributes of the participants in the conversations and creates groups of conversations, where each group shares a common set of participant attribute values. Each such group represents a conversation participant attribute cluster.

Attributes evaluated include inter alia (i) attributes of the participants in the conversations as determined by conversation analyzer 300, such as (a) tendency to interrupt, (b) talk burst times, (c) valence, (d) arousal; (ii) classes of the participants in the conversations as determined by participant classifier 400 such as (a) introvert, (b) extrovert, (c) conversation leader, (d) conversation participator; and (iii) clusters of the participants in the conversation as determined by participant classifier 400.

In an embodiment of the present invention conversation classifier 500 includes in its evaluation and clustering participant attributes as determined by conversation analyzer 300 and participant classes and clusters as determined by participant classifier 400.

In a further embodiment of the present invention, conversation classifier 500 includes in its evaluation and clustering only participant attributes as determined by conversation analyzer 300.

In yet a further embodiment of the present invention, conversation classifier 500 includes in its evaluation and clustering only participant classes and clusters as determined by participant classifier 400.

As an illustrative example, conversation classifier 500 may create a cluster of conversations all of which include six participants, where a minority of the participants had a high tendency to interrupt in the conversation and a single participant had long talk burst times in the conversation.

As a second illustrative example, conversation classifier 500 may create a cluster of conversations where a majority of the participants had a high tendency to interrupt in the conversation, and a majority of the participants exhibited negative valence in the conversation classifier 500.

As a third illustrative example, conversation classifier 500 may create a cluster of conversations where all participants were classified as introvert.

It will be appreciated by those skilled in the art that there may be thus created clusters of conversation participant attributes where each cluster represents conversations of a particular subjective nature, such as inter alia heated conversations, relaxed conversations, conversations with leaders, and leaderless conversations. In the first illustrative example above, the cluster may represent leader-led conversations. In the second illustrative example above, the cluster may represent confrontational and unpleasant conversations. In the third illustrative example, the cluster may represent overly quiet or uninteresting conversations.

At operation 506 conversation classifier 500 determines for each conversation participant attribute cluster a quality score for the cluster. The score is determined by calculating the average of the quality scores of all the conversations in the cluster.

In an alternative embodiment of the present invention, conversation classifier 500, when calculating the quality score of the cluster, discards quality values that are more than a predetermined number of standard deviations from the mean. Thus in this embodiment conversation classifier 500 ignores outlying values.

At each of operations 502 through 506, conversation classifier 500 stores classification and cluster data as generated in the respective operations in conversation classification database 550.

As conversation classifier 500 receives information regarding additional conversations, it re-classifies and re-clusters the conversations and conversation participant attributes based on the aggregate of the information from all the conversations.

It will be appreciated by those skilled in the art that the more conversations evaluated by conversation classifier 500, the more accurate and more useful the classifying and clustering will be. Thus over time, after evaluating multiple conversations with multiple participants, conversation classifier 500 builds up an accurate classification of conversations and conversation participant attributes into one or more of the predetermined classes, and builds up an accurate set of clusters of conversation participant attributes.

V. Compatibility Generator 600

Figure 9A:
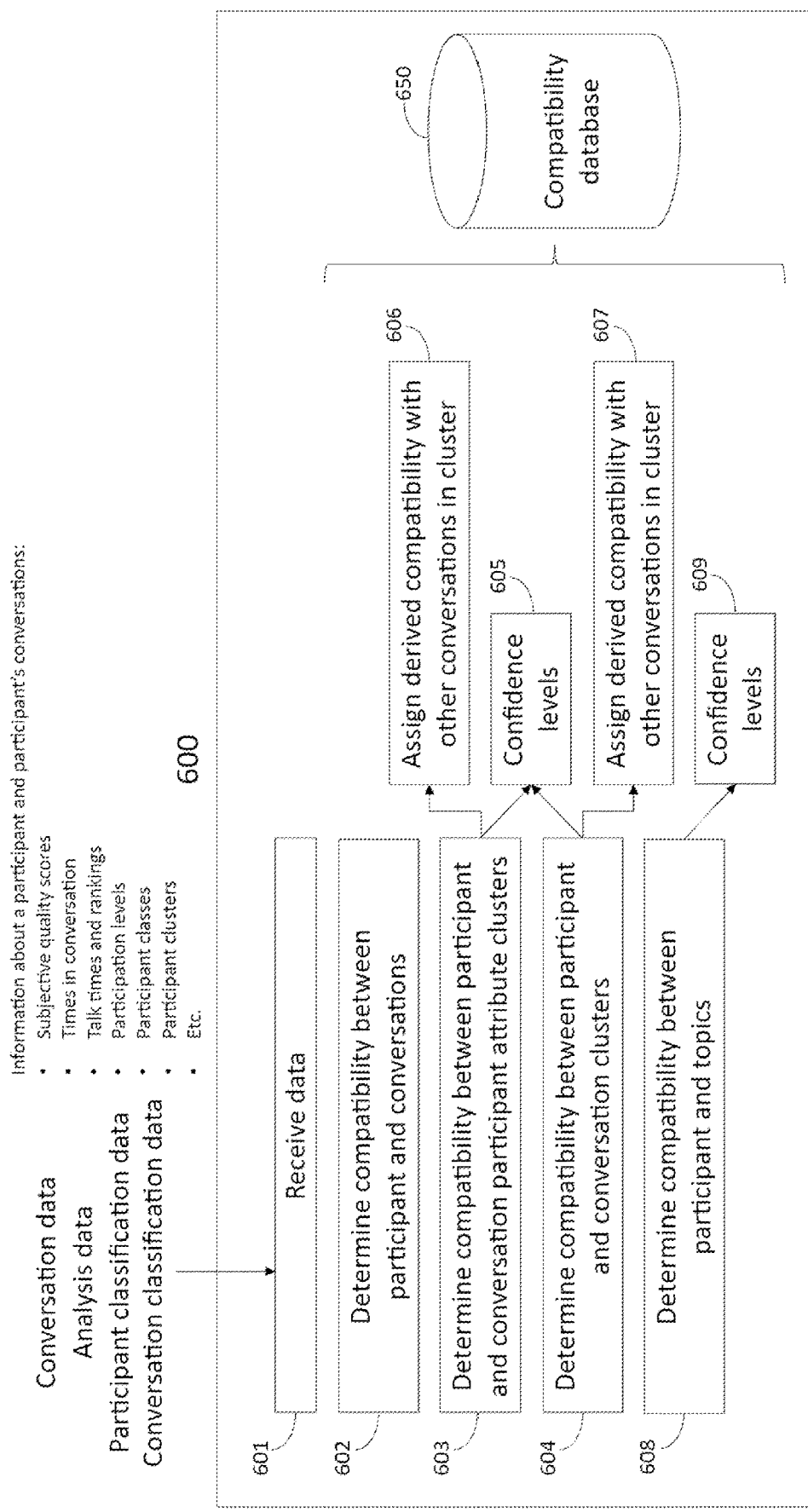
FIG. 9A is a high-level schematic diagram of a compatibility generator, in accordance with an embodiment of the present invention.

Reference is made to FIG. 9A, which is a high-level schematic diagram of a compatibility generator, in accordance with an embodiment of the present invention. FIG. 9A includes analysis operations 601 through 609, and compatibility database 650 which stores compatibility data.

Compatibility generator 600 evaluates conversation data such as data stored in conversation database 250 by conversation recorder 200, data stored in analysis database 350 by conversation analyzer 300, data stored in participant classification database 450 by participant classifier 400, and data stored in conversation classification database 550 by conversation classifier 500.

Compatibility generator 600 generates compatibility scores between individuals and conversations, between individuals and conversation types, between pairs of individuals, and between individuals and topics, and stores these scores in compatibility database 650.

As described further hereinbelow, compatibility generator 600 determines compatibility scores between individuals, even if the specified individuals have not previously participated together in a conversation. Furthermore, compatibility generator 600 determines compatibility scores between conversations and participants even for conversations in which the participants did not participate.

Compatibility between a participant and a conversation in which the participant participated is referred to as "direct compatibility". Compatibility between a participant and a conversation in which the participant did not participate is referred to as "derived compatibility".

Similarly, compatibility between a pair of participants who have participated in a conversation together is referred to as "direct compatibility". Compatibility between a pair of participants who have not participated in a conversation together is referred to as "derived compatibility".

It will be appreciated by those skilled in the art that compatibility metrics are useful for establishing conversations between people, and selecting participants for the conversations, in a manner that maximizes the enjoyment of all the participants.

At operation 601 compatibility generator 600 receives information regarding a designated participant and conversations in which the designated participant participated, including, inter alia (i) subjective quality scores of the conversations as reported by the designated participant, (ii) subjective quality scores of the conversations as reported by third parties, (iii) lengths of time the designated participant spent in the conversations, (iv) relative talk time ranks of the participants in the conversations, (v) participation levels of the designated participant in the conversations, (vi) participant classes in which the designated participant is a member, and (vii) participant clusters in which the designated participant is a member.

At operation 602 compatibility generator 600 evaluates the information received and determines, for each conversation, a compatibility score between the participant and the designated conversation. The determination is made by calculating an average of: (i) subjective quality score of the conversation as reported by the participant, expressed as a percentage; (ii) subjective quality score of the conversation as reported by a third party, expressed as a percentage; (iii) length of time the participant spent in the conversation, expressed as a percentage of a predetermined amount of time, with a maximum value of 100%; (iv) relative talk time rank of the participant in the conversation, expressed as a percentage; and (v) participation level of the participant in the conversation.

In an embodiment of the present invention, compatibility generator 600 may attribute a greater importance to one or more of the values received, and calculate a weighted rather than a simple average of the values.

As an illustrative example, compatibility generator 600 may receive a subjective quality score and a length of time the participant spent in the conversation, and attribute a double weight to the subjective score. If the quality score was 40% and the length of time was 100%, the weighted average in this example would be calculated as "(40%+40%+100%)/3", which is 60%; whereas a simple average of the two values received would be 75%.

In an embodiment of the present invention, compatibility generator 600 utilizes in this determining all the information received at operation 601, and calculates an average of all the values in order to determine the compatibility score.

In an alternative embodiment of the present invention, compatibility generator 600 does not receive any subjective quality scores for a conversation. In this embodiment compatibility generator 600 performs calculations similar to those described hereinabove on only the objective values received.

In a further alternative embodiment of the present invention, compatibility generator 600 includes in its calculating only some of the values received at operation 601 and ignores others.

In an embodiment of the present invention, compatibility generator 600 uses the length of time the participant spent in the conversation as a gating factor, wherein any value below a predetermined threshold causes compatibility generator

600 to determine that the compatibility score between the participant and the conversation is zero, regardless of any other values received.

In an alternative embodiment of the present invention, compatibility generator 600 uses the length of time the participant spent in the conversation as a gating factor, wherein any value below a predetermined threshold causes compatibility generator 600 to not perform an evaluation on the conversation. Compatibility generator 600 will thus treat conversations in which the length of time falls below the predetermined threshold the same as conversations in which the participant did not participate.

In a further alternative embodiment of the present invention, compatibility generator 600 uses the relative talk time rank of the participant in the conversation as a gating factor, wherein any value below a predetermined threshold causes compatibility generator 600 to determine that the compatibility score between the participant and the conversation is zero, regardless of any other values received.

It will be appreciated by those skilled in the art that this embodiment causes to be determined incompatible with the participant those conversations in which the participant was not an active talker.

In yet a further alternative embodiment of the present invention, compatibility generator 600 uses the relative talk time rank of the participant in the conversation as a gating factor, wherein any value below a predetermined threshold causes compatibility generator 600 to not perform an evaluation on the conversation. Compatibility generator 600 will thus treat conversations in which the relative talk time rank falls below the predetermined threshold the same as conversations in which the participant did not participate.

In an embodiment of the present invention, compatibility generator 600 determines that a designated conversation is either compatible or incompatible with the participant. In this embodiment compatibility generator performs calculations as described hereinabove, and establishes a threshold below which the conversation is determined to be incompatible with the participant.

In an alternative embodiment of the present invention, compatibility generator 600 determines compatibility levels between the participant and the designated conversation. The determination is made by comparing the compatibility score between the participant and the conversation with a set of predefined thresholds for different levels of compatibility.

As an illustrative example, compatibility generator 600 may determine that the compatibility between a participant and a designated conversation is "incompatible" if the compatibility score was less than 40%, "neutral" if the score was between 40% and 60%, "compatible" if the score was between 60% and 80%, and "very compatible" if the score was above 80%.

At operation 603 compatibility generator 600 evaluates conversation participant attribute clusters as recorded in conversation classification database 550, and determines compatibility scores between a designated participant and the conversation participant attribute clusters. The determination is made only for those clusters containing at least one conversation in which the participant participated. The determination is made by calculating the average of the compatibility scores between the participant and the respective conversations in the designated cluster in which the participant participated, expressed as a percentage.

At operation 604 compatibility generator 600 evaluates conversation clusters as recorded in conversation classification database 550, and determines compatibility scores between a designated participant and the conversation clusters. The determination is made only for those clusters containing at least one conversation in which the participant participated. The determination is made by calculating the average of the compatibility scores between the participant and the respective conversations in the designated cluster in which the participant participated, expressed as a percentage.

In an embodiment of the present invention, compatibility generator 600 determines that a designated participant is either compatible or incompatible with the clusters. In this embodiment compatibility generator performs calculations as described hereinabove, and establishes a threshold below which the clusters are determined to be incompatible.

In an alternative embodiment of the present invention, compatibility generator 600 determines compatibility levels between a designated participant and the clusters. The determination is made by comparing the average compatibility scores between the designated participant and the clusters with a set of predetermined thresholds for different levels of compatibility.

As an illustrative example, compatibility generator 600 may determine that scores below 50% are considered incompatible and scores of 50% and above are considered compatible.

As a further illustrative example, compatibility generator 600 may determine that scores below 30% are considered incompatible, scores between 30% and 60% are considered moderately compatible, and scores above 60% are considered highly compatible.

At operation 605 compatibility generator 600 associates confidence levels with the determined compatibility scores or compatibility levels between the designated participant and the clusters. The confidence levels are calculated for each cluster based on the number of conversations in the designated cluster in which the participant participated. The number of conversations is compared against a set of predetermined confidence thresholds, where each threshold represents a specific confidence level.

As an illustrative example, compatibility generator 600 may establish a threshold of one conversation for low confidence, two conversations for moderate confidence, and four conversations for high confidence. In this example a cluster containing two conversations in which a designated participant participated, and for which the compatibility scores between the participant and the conversations were 60% and 80% respectively, would be given a compatibility score with the participant of 70% with a moderate confidence level.

At operation 606 compatibility generator 600 evaluates conversation participant attribute clusters for which was determined a compatibility score or compatibility level between a designated participant and the cluster as described hereinabove, and assigns the compatibility score or compatibility level to each conversation in the cluster in which the designated participant did not participate, as a derived compatibility score or derived compatibility level between the designated participant and the designated conversation. If a confidence level was established for the compatibility score or compatibility level, the confidence level is likewise assigned as a derived confidence level.

At operation 607 compatibility generator 600 evaluates conversation clusters for which was determined a compatibility score or compatibility level between a designated participant and the cluster as described hereinabove, and assigns the compatibility score or compatibility level to each conversation in the cluster in which the designated participant did not participate, as a derived compatibility score or derived compatibility level between the designated participant and the designated conversation. If a confidence level was established for the compatibility score or compatibility level, the confidence level is likewise assigned as a derived confidence level.

As an illustrative example of deriving compatibility scores, compatibility generator 600 may determine that a designated participant participated in three conversations in a conversation participant attribute cluster including a total of one hundred conversations and being characterized by having one conversation leader and multiple conversation participants, as described hereinabove. Compatibility generator 600 may further determine that the compatibility scores between the participant and the three conversations were 70%, 80% and 90% respectively, with moderate confidence levels. Compatibility generator 600 would therefore determine that the remaining 97 conversations in the cluster, in which the designated participant did not participate, have a derived compatibility score of 80% with the designated participant, with a moderate derived confidence level.

The above illustrative example may be restated in an informal manner as determining that a particular person enjoys conversations in which one person is a conversation leader, rather than conversations in which many people participate equally.

At operation 608 compatibility generator evaluates conversations in which a designated participant participated, and for which a topic was recorded in conversation database 250, and determines compatibility scores between the participant and the topics. The determination is made by calculating an average of: (i) subjective quality score of the conversation as reported by the participant, expressed as a percentage; (ii) length of time the participant spent in the conversation, expressed as a percentage of a predetermined amount of time, with a maximum value of 100%; (iii) relative talk time rank of the participant in the conversation, expressed as a percentage; and (iv) participation level of the participant in the conversation.

In an embodiment of the present invention, compatibility generator 600 may attribute a greater importance to one or more of the values received, and calculate a weighted rather than a simple average of the values.

In an alternative embodiment of the present invention, the compatibility score calculation is weighted by time, with more recent conversations being given a greater weight than older conversations.

In an embodiment of the present invention, compatibility generator 600 determines that a designated participant is either compatible or incompatible with a topic. In this embodiment compatibility generator 600 performs calculations as described hereinabove, and establishes a threshold below which the participant is determined to be incompatible with the topic.

In a further alternative embodiment of the present invention, compatibility generator 600 determines compatibility levels between a designated participant and topics. The determination is made by comparing the compatibility score between the participant and a topic with a set of predetermined thresholds for different levels of compatibility.

As an illustrative example, compatibility generator 600 may determine that the compatibility between a designated participant and the topic of "travel" is "incompatible" if the compatibility score was less than 40%, "neutral" if the score was between 40% and 60%, "compatible" if the score was between 60% and 80%, and "very compatible" if the score was above 80%.

In an embodiment of the present invention, compatibility generator 600 utilizes, in its determining, all the information received at operation 601, and calculates an average of all the values in order to determine the compatibility score.

In an alternative embodiment of the present invention, compatibility generator 600 does not receive any subjective quality scores for a conversation. In this embodiment compatibility generator 600 performs calculations similar to those described hereinabove on only the objective values received.

In a further alternative embodiment of the present invention, compatibility generator 600 includes in its calculating only some of the values received at operation 601 and ignores others.

In an embodiment of the present invention, compatibility generator 600 uses the length of time the participant spent in the conversation as a gating factor, wherein any value below a predetermined threshold causes compatibility generator 600 to not perform an evaluation on the conversation. Compatibility generator 600 thus treats conversations in which the length of time falls below the predetermined threshold the same as conversations in which the participant did not participate.

In an alternative embodiment of the present invention, compatibility generator 600 uses the relative talk time rank of the participant in the conversation as a gating factor, wherein any value below a predetermined threshold causes compatibility generator 600 to not perform an evaluation on the conversation. Compatibility generator 600 will thus treat conversations in which the relative talk time rank falls below the predetermined threshold the same as conversations in which the participant did not participate.

At operation 609 compatibility generator 600 associates confidence levels with the determined compatibility scores or compatibility levels between the designated participant and the topics. The confidence levels are calculated for each topic based on the number of conversations on the designated topic in which the participant participated. The number of conversations is compared against a set of predetermined confidence thresholds where each threshold represents a specific confidence level.

Figure 9B:
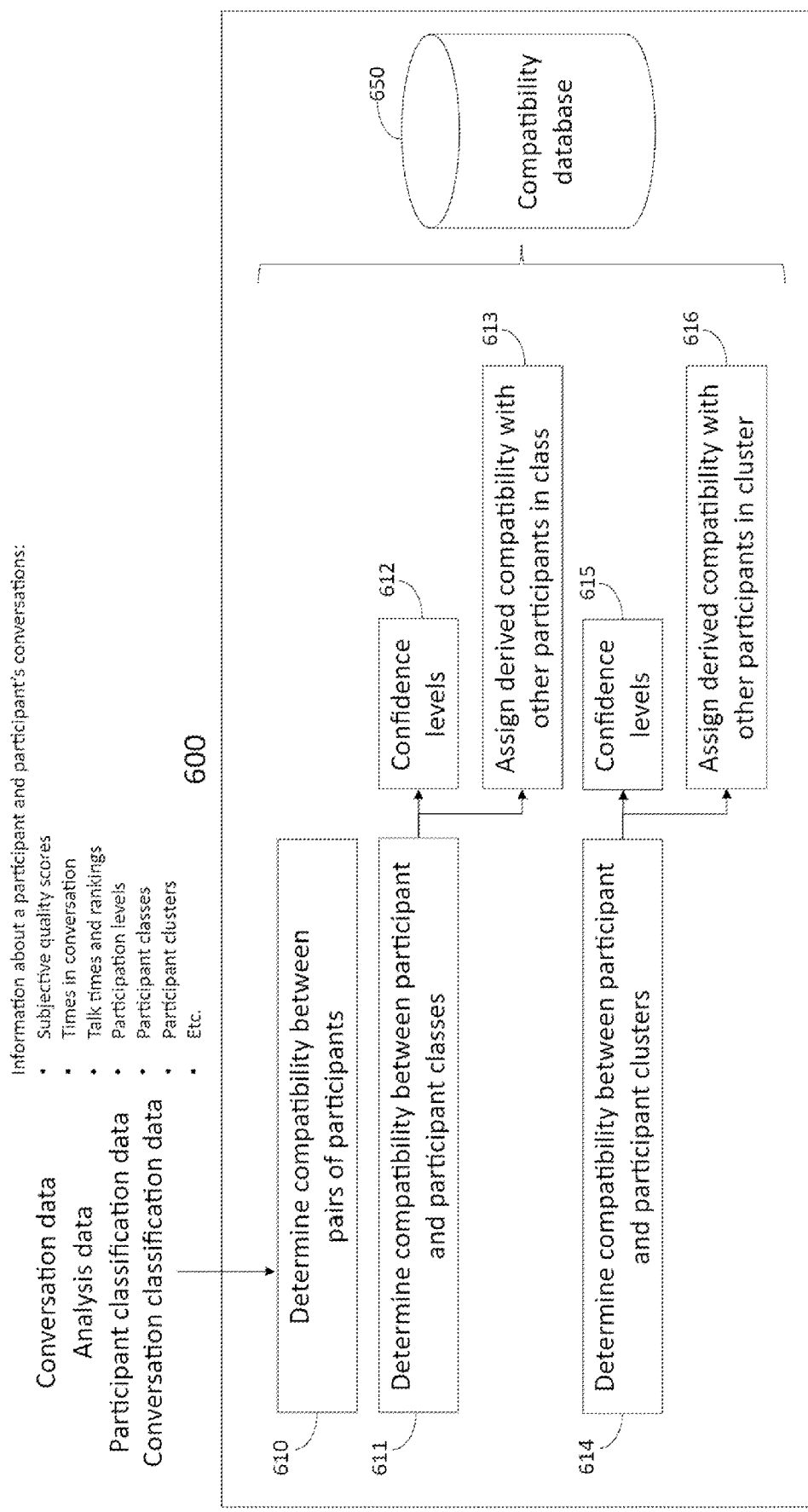
FIG. 9B is a high-level schematic diagram of additional aspects of a compatibility generator, in accordance with an embodiment of the present invention.

Reference is made to FIG. 9B, which is a high-level schematic diagram of additional aspects of a compatibility generator in accordance with an embodiment of the present invention. FIG. 9B includes analysis operations 610 through 616, and compatibility database 650 which stores compatibility data.

At operation 610 compatibility generator 600 evaluates conversations and determines compatibility scores between pairs of participants in the conversations.

Compatibility scores determined between pairs of individuals are symmetrical, such that the compatibility between the first member of a designated pair and the second member of the pair is the same as the compatibility between the second member and first.

Compatibility generator 600 determines compatibility scores between pairs of participants in conversations with only two participants, and in conversations with multiple participants.

When evaluating a conversation with only two participants, compatibility generator 600 evaluates the subjective quality scores of the conversation provided by the participants and the length of the conversation, and determines a compatibility score between the participants.

If both participants provided a quality score, and the length of the conversation is more than a predetermined threshold, the compatibility score is calculated as the average of the quality scores provided.

In an embodiment of the present invention, if both participants provided a quality score and the score provided by one of the participants is below a predetermined threshold, a compatibility score is not determined for the participants.

If one participant provided a quality score and the other participant did not, and the length of the conversation is more than a predetermined threshold, the compatibility score is set to the score provided.

If the length of the conversation is shorter than a predetermined threshold, no compatibility score is established between the participants, even if one or both participants provided a quality score.

If neither participant provided a quality score, the compatibility score is determined from the length of the conversation based on predetermined length thresholds.

As an illustrative example, compatibility generator may establish thresholds of two minutes and five minutes. For conversations shorter than two minutes, a compatibility score of 0% is given. For conversations between two minutes and five minutes, a compatibility score of 50% is given. For conversations longer than five minutes a compatibility score of 80% is given.

When evaluating a multi-participant conversation, compatibility generator 600 evaluates the subjective quality scores of the conversation provided by the participants, the length of the conversation, the times the participants were talking in the conversation, and the participation levels of the participants in the conversation.

If the length of the conversation is shorter than a predetermined threshold, a compatibility score is not determined for any of the participants.

Participants whose participation level in the conversation is below a predetermined threshold are not evaluated for compatibility, and a compatibility score is not determined for them.

Participants who provided a subjective quality score for the conversation, and whose quality score is below a predetermined threshold are not evaluated for compatibility, and a compatibility score is not determined for them.

Compatibility generator 600 calculates an average value of the subjective quality scores provided by all the participants being evaluated, and establishes the average as the compatibility score between all pairs of such participants.

If none of the participants being evaluated provided a quality score, the compatibility score is determined from the length of the conversation based on predetermined length thresholds.

In an embodiment of the present invention compatibility generator 600 evaluates the times the participants being evaluated were talking in the conversation and determines if any pair of participants engaged in a back-and-forth conversation, defined as a period of time where each member of the pair's talking time followed the talking time of the other member at least a predetermined number of times. The compatibility scores of a pair so determined are increased by a predetermined amount or a predetermined percentage.

In a further embodiment of the present invention compatibility generator 600 evaluates the participation levels of the participants being evaluated and determines if any pair of participants had substantially higher participation levels than the average participation level of the participants being evaluated. The compatibility scores of a pair so determined are increased by a predetermined amount or a predetermined percentage.

In an embodiment of the present invention, compatibility generator 600 determines that pairs of participants are either compatible or incompatible with each other. In this embodiment compatibility generator performs calculations as described hereinabove, and establishes a threshold below which the pair is determined to be incompatible.

In an alternative embodiment of the present invention, compatibility generator 600 determines compatibility levels between pairs of participants. The determination is made by comparing the compatibility score for a designated pair with a set of predetermined thresholds for different levels of compatibility.

As an illustrative example, compatibility generator 600 may determine that the compatibility between a designated pair of participants is "incompatible" if the compatibility score is less than 40%, "neutral" if the score is between 40% and 60%, "compatible" if the score is between 60% and 80%, and "very compatible" if the score is above 80%.

At operation 611 compatibility generator 600 evaluates the compatibility levels and compatibility scores determined between a designated participant and other participants, evaluates participant classes in which the other participants are members, and determines compatibility scores between the designated participant and participant classes. The determination is made by calculating, for each class in which any of the other participants are members, the average of the compatibility scores between the designated participant and participants who are members of the designated class.

In an embodiment of the present invention, compatibility generator 600 determines that the designated participant is either compatible or incompatible with the participant classes. In this embodiment compatibility generator 600 performs calculations as described hereinabove, and establishes a threshold below which the designated participant is determined to be incompatible with the classes.

In an alternative embodiment of the present invention, compatibility generator 600 determines compatibility levels between the designated participant and the participant classes. In this embodiment compatibility generator 600 performs calculations as described hereinabove and compares the scores thus generated with a set of predetermined thresholds for different levels of compatibility.

As an illustrative example, compatibility generator 600 may determine that scores below 50% are considered incompatible and scores of 50% and above are considered compatible.

As a further illustrative example, compatibility generator 600 may determine that scores below 30% are considered incompatible, scores between 30% and 60% are considered moderately compatible, and scores above 60% are considered highly compatible.

At operation 612 compatibility generator 600 associates confidence levels with the determined compatibility scores or compatibility levels between the designated participant and the participant classes. The confidence levels are calculated for each class based on the number of compatibility scores used when calculating the average compatibility score for the class. The number of scores is compared against a set of predetermined confidence thresholds, where each threshold represents a specific confidence level.

As an illustrative example, compatibility generator 600 may establish a threshold of one score for low confidence, two scores for moderate confidence, and four scores for high confidence. In this example a participant with a compatibility score of 60% with a first member of a designated participant class and a compatibility score of 80% with a second member of the class is given a compatibility score with the class of 70% with a moderate confidence level.

At operation 613 compatibility generator 600 evaluates participant classes for which was determined a compatibility score or compatibility level between a designated participant and the class as described hereinabove, and assigns the compatibility score or compatibility level as a derived compatibility score or derived compatibility level between the designated participant and each participant in the class for which there was not previously established a compatibility score or a compatibility level. If a confidence level was established for the compatibility score or compatibility level, the confidence level is likewise assigned as a derived confidence level.

At operation 614 compatibility generator 600 evaluates the compatibility levels and compatibility scores determined between a designated participant and other participants, evaluates participant clusters in which the other participants are members, and determines compatibility scores between the designated participant and participant clusters. The determination is made by calculating, for each cluster in which any of the other participants are members, the average of the compatibility scores between the designated participant and participants who are members of the designated cluster.

In an embodiment of the present invention, compatibility generator 600 determines that the designated participant is either compatible or incompatible with the participant clusters. In this embodiment compatibility generator 600 performs calculations as described hereinabove, and establishes a threshold below which the designated participant is determined to be incompatible with the clusters.

In an alternative embodiment of the present invention, compatibility generator 600 determines compatibility levels between the designated participant and the participant clusters. In this embodiment compatibility generator 600 performs calculations as described hereinabove and compares the scores thus generated with a set of predetermined thresholds for different levels of compatibility.

As an illustrative example, compatibility generator 600 may determine that scores below 50% are considered incompatible and scores of 50% and above are considered compatible.

As a further illustrative example, compatibility generator 600 may determine that scores below 30% are considered incompatible, scores between 30% and 60% are considered moderately compatible, and scores above 60% are considered highly compatible.

At operation 615 compatibility generator 600 associates confidence levels with the determined compatibility scores or compatibility levels between the designated participant and the participant clusters. The confidence levels are calculated for each cluster based on the number of compatibility scores used when calculating the average compatibility score for the cluster. The number of scores is compared against a set of predetermined confidence thresholds, where each threshold represents a specific confidence level.

As an illustrative example, compatibility generator 600 may establish a threshold of one score for low confidence, two scores for moderate confidence, and four scores for high confidence. In this example a participant with a compatibility score of 60% with member of a designated participant cluster and a compatibility score of 80% with a second member of the cluster is given a compatibility score with the cluster of 70% with a moderate confidence level.

At operation 616 compatibility generator 600 evaluates participant clusters for which there was determined a compatibility score or compatibility level between a designated participant and the cluster as described hereinabove, and assigns the compatibility score or compatibility level as a derived compatibility score or derived compatibility level between the designated participant and each participant in the cluster for which there was not previously established a compatibility score or a compatibility level. If a confidence level was established for the compatibility score or compatibility level, the confidence level is likewise assigned as a derived confidence level.

At each of operations 602 through 616, compatibility generator 600 stores compatibility data as generated in the respective operations in compatibility database 650.

It will be appreciated by those skilled in the art that the calculations described hereinabove for determining compatibility scores, binary compatibilities, and compatibility levels represent arithmetical calculations on sets of input parameters. As such, any number of different arithmetical or mathematical functions may be used with equal or greater extent to those described hereinabove.

As compatibility generator 600 receives information regarding additional participants and additional conversations, it reevaluates and redetermines the compatibility values and scores as described hereinabove based on the aggregate of the information from all the participants and conversations.

It will be appreciated by those skilled in the art that the more participants and conversations evaluated by compatibility generator 600, the more accurate and more useful the compatibility values and scores will be. Thus over time, after evaluating multiple conversations with multiple participants, compatibility generator 600 will build up an accurate matrix of compatibilities between participants and conversations, participants and each other, and participants and topics.

VI. Participant Manager 700

Figure 10A:
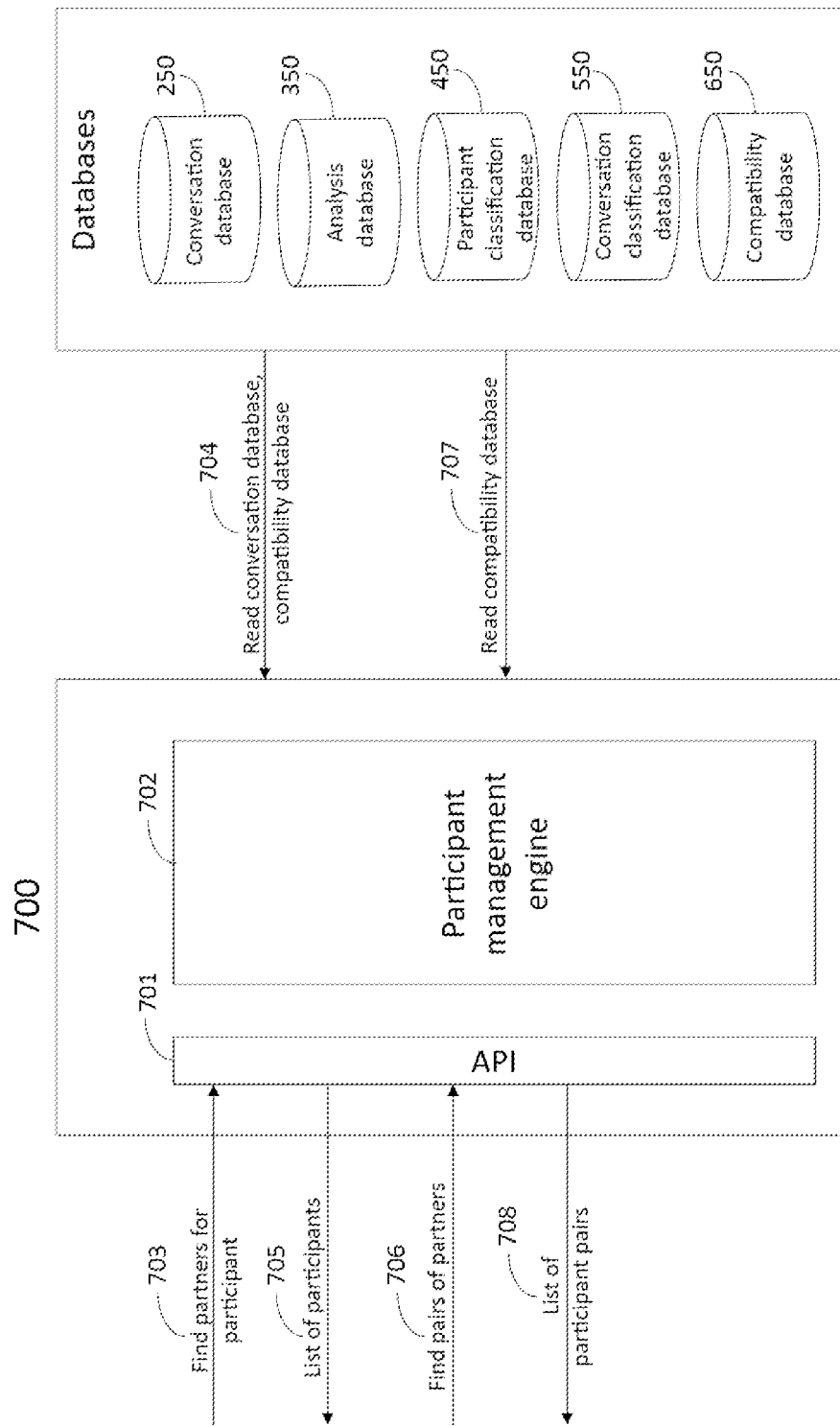
FIG. 10A is a high-level schematic diagram of a participant manager, in accordance with an embodiment of the present invention.
Figure 10B:
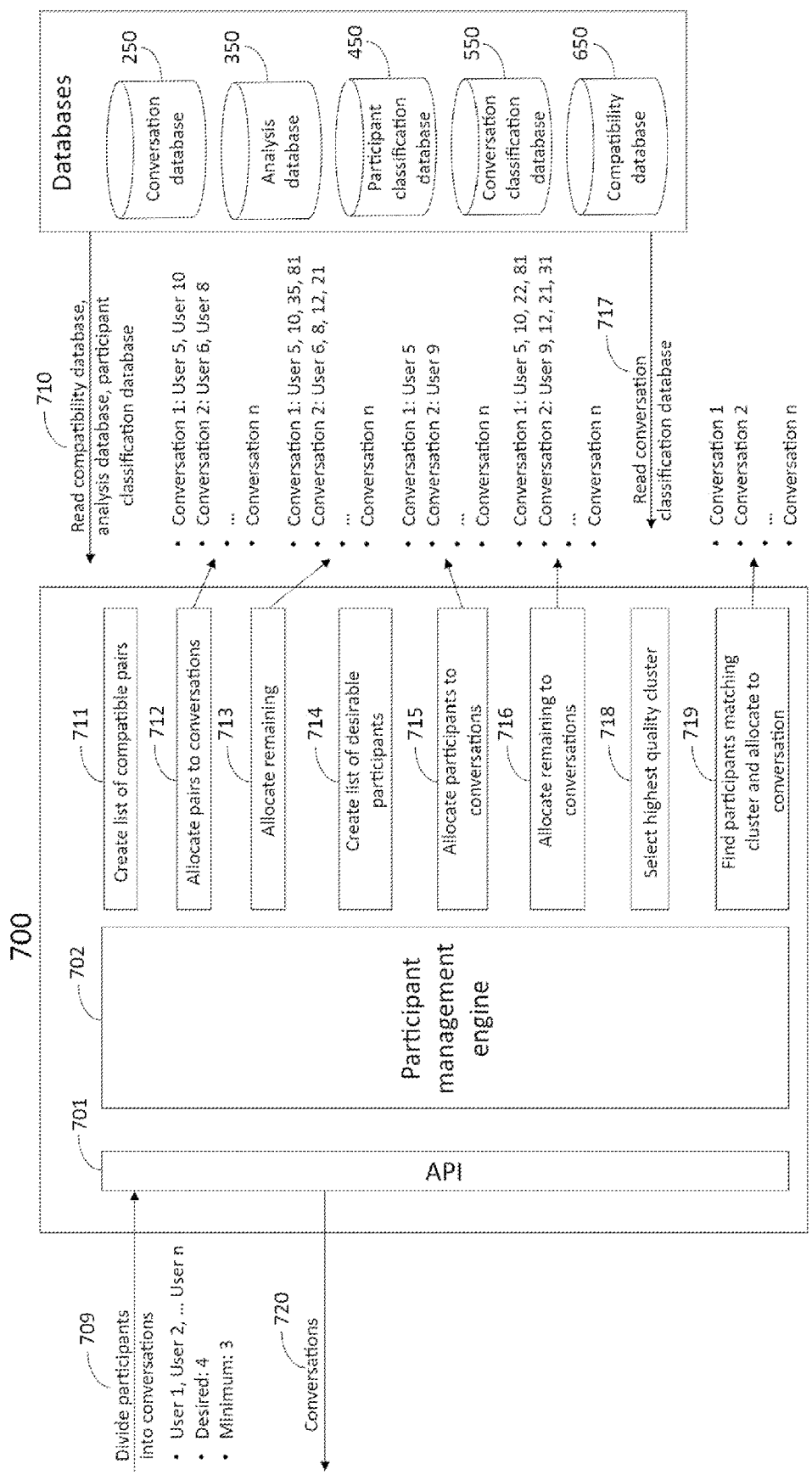
FIG. 10B is a high-level schematic diagram of additional aspects of a participant manager, in accordance with an embodiment of the present invention.

Reference is made to FIG. 10A, which is a high-level schematic diagram of a participant manager, in accordance with an embodiment of the present invention. FIG. 10A includes API 701, operations 703 through 708, and participant management engine 702.

Participant manager 700 determines optimal sets of participants for conversations.

API 701 is a conventional Application Programmer Interface. It receives a variety of messages including inter alia (i) requests to find a conversation partner for a person, (ii) requests to find pairs of potential conversation partners, (iii) requests to allocate a person to one of a number of conversations, and (iv) requests to divide a set of people into conversations.

At operation 703 participant manager 700 receives a request to find potential conversation partners for a designated participant. The request contains metadata including (i) an identifier of the designated participant, and (ii) a maximum number of potential partners to find.

At operation 704 participant manager 700 reads compatibility database 650 and retrieves a set of conversation participants who have a direct compatibility or a derived compatibility with the designated participant, together with the associated compatibility levels or compatibility scores.

In an embodiment of the present invention participant manager additionally retrieves confidence levels for the compatibilities retrieved.

Participant manager 700 sorts the set of participants retrieved by compatibility level or compatibility score.

In an embodiment of the present invention participant manager 700 reads conversation database 250 and retrieves two-person conversations in which the designated participant and any one of the retrieved set of participants participated, and removes any such participants from the set.

In an embodiment of the present invention participant manager 700 reads conversation database 250 and retrieves multi-party conversations in which the designated participant participated, and in which one or more participants in the retrieved set participated, and increases the compatibility score or compatibility level of such participants by a predetermined amount.

As an illustrative example, participant manager 700 may retrieve a set of three participants, referred to as A, B, and C, having compatibility scores of 50%, 60% and 70%, respectively, with the designated participant. Participant B is found to have participated in a multi-party conversation with the designated participant in the past. The compatibility score of participant B is raised by 20 points to 80%, or alternatively by 20% to 72%. Participant B will therefore have the highest compatibility with the designated participant out of the three participants retrieved.

In an alternative embodiment of the present invention, participant manager 700 reads compatibility database 650 and conversation database 250 and retrieves a set of participants who have not participated with the designated participant in a two-person conversation, and who have participated with the designated participant in a multi-party conversation, and who do not have either a direct or a derived compatibility with the designated participant. Any such participants retrieved are given a predetermined compatibility score with the designated participant and added to the set of participants retrieved in operation 704.

At operation 705 participant manager 700 returns the set of participants retrieved together with their compatibility levels or compatibility scores and the associated confidence levels, up to the maximum number of potential partners requested. If fewer than the maximum requested number are retrieved, participant manager 700 returns all the participants retrieved.

The participants thus retrieved and thus returned are retrieved and sorted based on measures of compatibility, which are in turn derived from attributes of participants, attributes of conversations, classes of participants, classes of conversations, clusters of participants, and clusters of conversations, as described hereinabove.

The participants thus returned may ultimately be selected based on any combination of one or more of these attributes, classes, and clusters.

At operation 706 participant manager 700 receives a request to find pairs of potential conversation partners. The request contains metadata including a maximum number of potential pairs to find.

At operation 707 participant manager 700 reads compatibility database 650 and retrieves a set of direct compatibility scores and derived compatibility scores between participants, in descending order of score, up to the maximum number of pairs requested.

If any given participant is represented in more than one such retrieved compatibility score, participant manager 700 removes from the set all such scores except the highest score.

Participant manager 700 continues to retrieve compatibility scores from the database until the specified maximum number of pairs are retrieved wherein each score represents a discrete pair of participants.

At operation 708 participant manager 700 returns the set of compatibility scores together with their associated participant pairs. If fewer than the maximum requested number are retrieved, participant manager 700 returns all the pairs retrieved.

Reference is made to FIG. 1013, which is a high-level schematic diagram of additional aspects of a participant manager in accordance with an embodiment of the present invention. FIG. 1013 includes API 701, operations 709 through 720, and participant management engine 702.

At operation 709 participant manager 700 receives a request to divide a set of participants into multiple conversations. The request contains metadata including (i) identifiers of the participants, (ii) the desired number of participants per conversation, and (iii) the minimum number of participants per conversation.

Participant manager 700 determines, based on the request received at operation 709, the required number of conversations to create. The required number of conversations is calculated by dividing the total number of participants by the desired number of participants per conversation. If there is no remainder, the required number of conversations is the result of the division. If the remainder is equal to or greater than the minimum number of participants per conversation, the required number of conversations is the result of the division plus one. If the remainder is less than the minimum number of participants per conversation, the required number of conversations is the result of the division. In this case one or more conversations will contain more than the desired number of participants.

Participant manager 700 divides participants into conversations using multiple alternative methods as will be described further hereinbelow. One such method allocates two mutually compatible participants to each conversation, and then proceeds to fill in the conversations with additional participants. Another such method allocates one participant to each conversation based on various attributes of the participants, and then proceeds to fill in the conversations with additional participants. Yet another such method builds entire conversations based on participant attribute clusters.

At operation 710 participant manager 700 reads compatibility database 650 and retrieves a set of all direct compatibility scores and derived compatibility scores between any pair of participants in the request.

Participant manager 700 additionally reads analysis database 350 and retrieves participant attributes for each of the participants in the set.

Participant manager 700 additionally reads participant classification database 450 and retrieves information about classes determined for each of the participants in the set.

At operation 711 participant manager 700 sorts the compatibility scores retrieved and, starting from the highest score, iterates through the scores and adds each score's pair of participants to an ordered list of participant pairs. If, when adding a pair to the list, either of the participants already appears in the list, neither of the participants in the pair are added. There is thus created an ordered list of discrete participant pairs for adding to conversations, each pair of which has a compatibility score.

At operation 712 participant manager 700 then iterates through the list of pairs and allocates one pair per conversation until either the required number of conversations is reached or the list of pairs is exhausted.

If the list of pairs is exhausted before the required number of conversations is reached, participant manager 700 continues to allocate the remaining unallocated participants in random pairs, one pair per conversation, until the required number of conversations is reached.

After creating the desired number of conversations with two participants in each, participant manager 700 proceeds to allocate the remainder of the participants in the set to the conversations.

At operation 713 participant manager 700 allocates the remainder of the participants in the set evenly across conversations, one per conversation in round robin fashion, in random order.

In an alternative embodiment of the present invention participant manager 700 allocates the remainder of the participants in the set by first allocating the remaining pairs in the list of pairs evenly across conversations, one pair per conversation in round robin fashion, and only when the list of pairs is exhausted allocating the remainder of the participants in the set evenly across conversations, one participant per conversation in round robin fashion, in random order.

At operation 714 participant manager 700 evaluates data retrieved from analysis database 350 and participant classification database 450 and determines which participants in the set would be desirable conversation partners based on their attributes.

In an embodiment of the present invention, participants classified as conversation leader are determined to be desirable.

In an alternative embodiment of the present invention, participants classified as extrovert are determined to be desirable.

In a further alternative embodiment of the present invention, participants with likability scores above a predetermined threshold are determined to be desirable.

In yet a further embodiment of the present invention, participants with any combination of (i) being classified as conversation leader, (ii), being classified as extrovert, and (iii) having likability scores above a predetermined threshold are determined to be desirable.

In an embodiment of the present invention desirable conversation partners are ranked by desirability. One such ranking considers the number of desirable attributes a participant has, where having a greater number of desirable attributes causes the desirability ranking to be higher. Another such ranking considers the likability score of the participants, where a higher likability score causes the desirability ranking to be higher. Yet another such ranking considers a combination of the number of desirable attributes and the likability score.

At operation 715 participant manager 700 allocates desirable participants to conversations, one per conversation in round robin fashion, in descending order of desirability, until all desirable participants are exhausted.

If not all participants in the set were determined to be desirable, at operation 716 participant manager 700 allocates, when the desirable participants are exhausted, the remaining unallocated participants evenly across conversations, one per conversation in round robin fashion, in random order.

It will be appreciated by those skilled in the art that the process of allocating users to conversations evenly based on attributes such as leadership and likability may ensure that every conversation has at least one person who will contribute positively to the enjoyment of all participants in the conversation.

It will be further appreciated by those skilled in the art that it may be desirable to take the opposite approach, and group participants with desirable attributes together such that some conversations may include primarily participants having desirable attributes while others may include primarily participants not having desirable attributes or having undesirable attributes.

Thus in a further embodiment of the present, invention participant manager allocates participants to conversations by iterating through the list of desirable participants in descending order of desirability and filling up conversations one at a time, up to the desired number of participants, until the list of desirable participants is exhausted.

When the list of desirable participants is exhausted, participant manager 700 allocates the remaining unallocated participants evenly across all conversations not yet filled to the desired number of participants, in random order.

At operation 717 participant manager 700 reads conversation classification database 550 and retrieves conversation participant attribute clusters which have the same number of participants as the desired number of participants per conversation received at operation 709.

At operation 718 participant manager 700 sorts the clusters by quality score, and selects the cluster with the highest quality score.

At operation 719 participant manager 700 evaluates the participant attributes in the selected cluster and finds a group of participants from the set of participants received at operation 709 whose attributes match those of the participant attributes in the cluster. The group of participants is allocated to a conversation.

Participant manager 700 repeats operation 719 on the remaining participants in the set, and allocates groups of participants to additional conversations, until no group matching the participant attributes in the selected cluster is found.

If no matching group is found, participant manager 700 iterates through the clusters in descending order of quality score, up to a predetermined maximum number of clusters. For each such cluster participant manager repeats operations 718 and 719 and allocates additional groups of participants from the set of participants to a conversation.

If the predetermined maximum number of clusters is evaluated and additional unallocated participants remain, participant manager 700 allocates the remaining participants to conversations in random order until the required number of conversations is reached.

In an alternative embodiment of the present invention, participant manager 700 allocates the remaining participants to conversations using one of the methods described hereinabove, rather than allocating them in random order.

In an embodiment of the present invention, after all participants in the set of participants received at operation 709 have been allocated to conversations, participant manager 700 iterates through the conversations and reads, for each conversation not originally generated based on a conversation participant attribute cluster as described hereinabove, conversation classification database 550, and retrieves conversation participant attribute clusters with participant attributes matching those of the participants in the designated conversations.

If more than one such cluster has a quality score below a predetermined threshold, the participants in the designated conversations are reallocated to the conversations differently.

In one embodiment of the present invention, the participants in the designated conversations are reallocated randomly.

In another embodiment of the present invention, the participants in the designated conversations are reallocated using one of the methods described hereinabove, but not the same method as was used originally to allocate the participants.

At operation 720 participant manager returns the conversations created along with the identifiers of the participants allocated to each respective conversation.

Figure 10C:
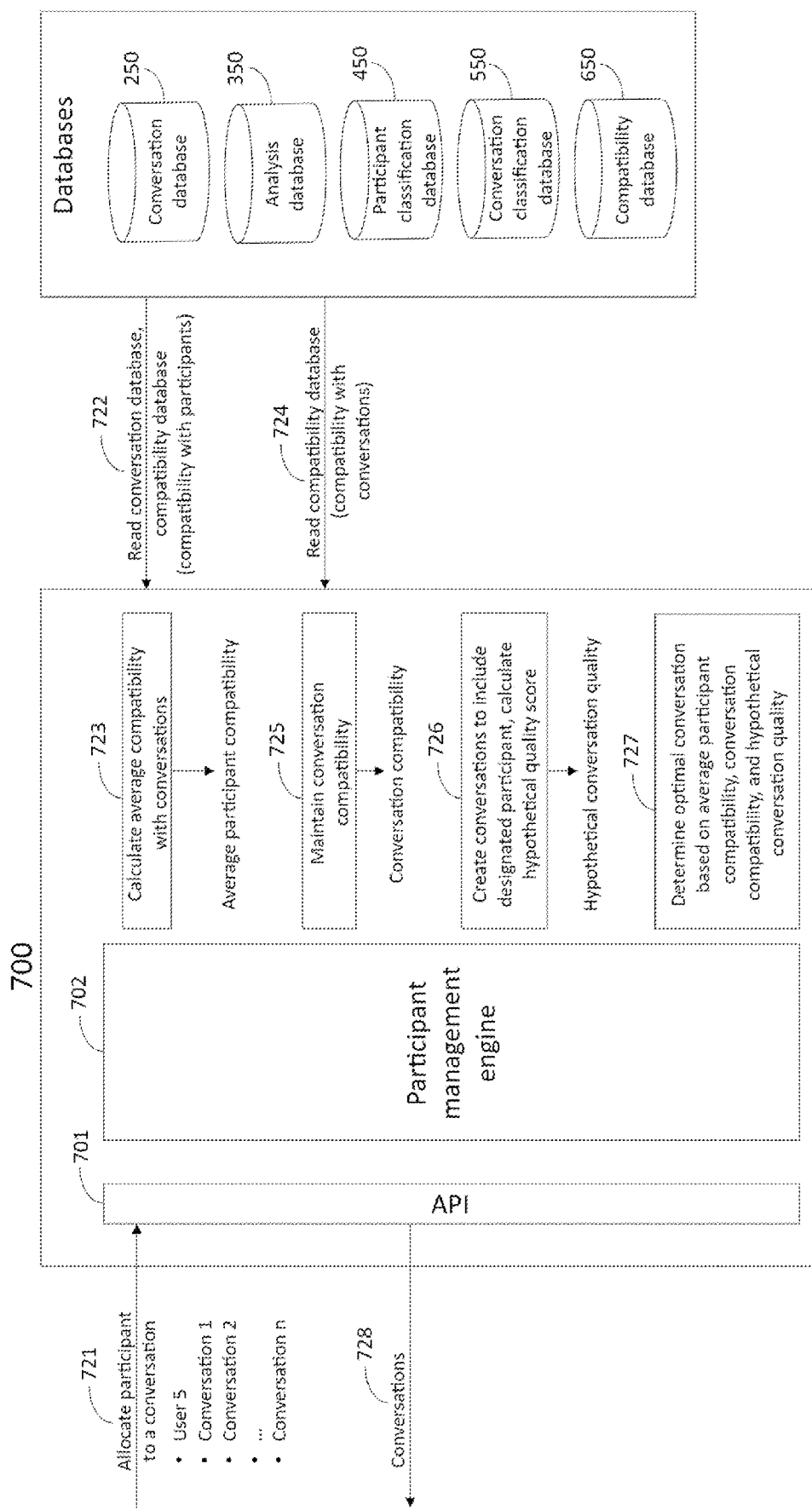
FIG. 10C is a high-level schematic diagram of further additional aspects of a participant manager in accordance with an embodiment of the present invention.

Reference is made to FIG. 10C, which is a high-level schematic diagram of further additional aspects of a participant manager in accordance with an embodiment of the present invention. FIG. 10C includes API 701, operations 721 through 728, and participant management engine 702.

At operation 721 participant manager 700 receives a request to allocate a designated participant to one of a number of conversations. The request contains metadata including (i) an identifier of the designated participant, and (ii) identifiers of the conversations.

At operation 722 participant manager 700 reads conversation database 250 and compatibility database 650 and retrieves direct compatibility scores and derived compatibility scores between the designated participant and each of the participants in each of the respective conversations in the request.

At operation 723 participant manager 700 calculates, for each of the conversations in the request, the average of the compatibility scores between the designated participant and each of the participants in the designated conversation, and maintains this average as an "average participant compatibility" score between the designated user and the conversation.

In an embodiment of the present invention participant manager 700 determines a confidence level for the average participant compatibility. The confidence level is calculated based on the number of participants in the designated conversation for which there was retrieved a compatibility score with the designated participant. The number of participants is compared against a set of predetermined confidence thresholds where each threshold represents a specific confidence level.

As an illustrative example, participant manager 700 may establish a threshold of one compatibility score in a conversation for moderate confidence, and two compatibility scores in a conversation for high confidence. Given a conversation in which the designated participant has a compatibility score of 60% with one participant in the conversation and a compatibility score of 80% with a second participant in the conversation, an average participant compatibility score of 70% would be calculated, with a high confidence level.

At operation 724 participant manager 700 reads compatibility database 650 and retrieves direct compatibility scores and derived compatibility scores between the designated participant and each of the conversations in the request.

At operation 725 participant manager 700 maintains these scores for each conversation as a "conversation compatibility" score between the designated participant and the respective conversation.

In an embodiment of the present invention participant manager 700 additionally reads compatibility database 650 and retrieves confidence levels for the conversation compatibility scores retrieved.

At operation 726 participant manager 700 creates sets of participants corresponding to each of the conversations in the request, with the additional inclusion of the designated participant in each set.

For each such set conversation classifier 500 determines a quality score for the set, as described hereinabove in operation 506. Participant manager 700 maintains these scores as "hypothetical conversation quality" scores for the respective conversations.

At operation 727 participant manager 700 evaluates the average participant compatibility scores, the conversation compatibility scores, the hypothetical conversation quality scores, and any associated confidence levels, and determines an optimal conversation from the conversations in the request to which to allocate the designated participant. The determination is made by calculating the average of the scores for each conversation and selecting the conversation with the highest average score.

In an alternative embodiment of the present invention, participant manager 700 increases those scores for which there is a moderate or high confidence level by predetermined percentages.

As an illustrative example, participant manager 700 may evaluate a conversation with an average participant compatibility score of 55% with moderate confidence, and a second conversation with a conversation compatibility score of 50% with high confidence. If the percentage increase for moderate confidence is 20% and the percentage increase for high confidence is 40%, participant manager 700 increases the average participant compatibility score to 66%, and the conversation compatibility score to 70%.

In a further alternative embodiment of the present invention, participant manager 700 calculates a weighted rather than a simple average of the scores, giving greater or lesser weight to each of the scores.

In yet a further alternative embodiment of the present invention, participant manager 700 increases the calculated average score for a conversation by a predetermined amount if two scores were used to calculate the average, and by another predetermined amount if three scores were used.

As an illustrative example, participant manager 700 may evaluate two conversations, the first of which has an average participant compatibility score of 50% and a hypothetical conversation quality score of 60%, and the second of which has conversation compatibility score of 70%. Using a simple average, the first conversation would have an average score of 55% and the second an average score of 70%. If the percentage increase for two scores were 30%, participant manager 700 would boost the average of the first conversation by 30%, resulting in an average score of 71.5%.

At operation 728 participant manager 700 returns the identifier of the conversation with the highest score, and the score determined.

VII. Conversation Manager 800

Figure 11:
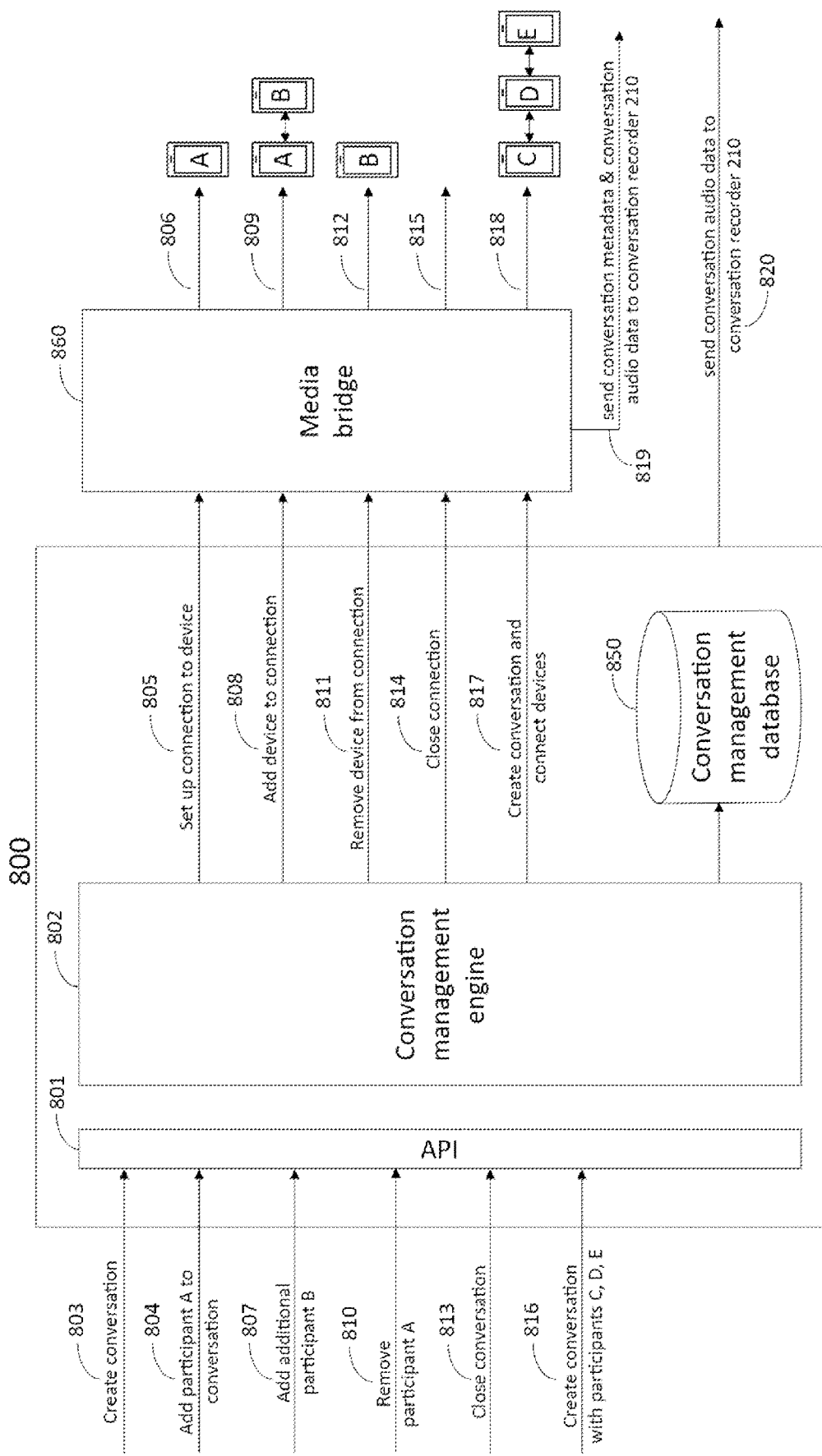
FIG. 11 is a high-level schematic diagram of a conversation manager, in accordance with an embodiment of the present invention.

Reference is made to FIG. 11, which is a high-level schematic diagram of a conversation manager, in accordance with an embodiment of the present invention. FIG. 11 includes API 801, conversation management engine 802, operations 803 through 817, conversation management database 850, and media bridge 860.

Conversation manager 800 creates conversations, deletes conversations, adds users to conversations, and removes users from conversations. Conversation manager 800 stores information about conversations in conversation management database 850.

In an embodiment of the present invention conversation manager 800 creates conversations where one or more conversation participants are associated with the conversations at the time they are set up.

In an alternative embodiment of the present invention conversation manager 800 creates conversations where participants are not yet associated with the conversations at the time they are set up.

Conversation manager 800 interfaces with media bridge 860 which transmits audio or audiovisual data between conversation participants. It will be appreciated by those skilled in the art that multiple conventional technologies exist for transmitting and receiving audio and audiovisual data between consumer devices, such as internet protocol (IP) based technologies commonly known as Voice over IP (VoIP) and Video over IP, any one of which may be utilized by the present invention.

API 801 is a conventional Application Programmer Interface. It receives a variety of messages including inter alia (i) request to create a conversation, (ii) request to close a conversation, (iii) request to add a person to a conversation, and (iv) request to remove a person from a conversation.

Conversation manager 800 stores in conversation management database 850 information regarding conversations and information regarding participants in conversations.

In an embodiment of the present invention conversation manager 800 sends to conversation recorder 200 conversation audio data, conversation metadata, and participant metadata.

In an alternative embodiment of the present invention media bridge 860 sends to conversation recorder 200 audio data while conversation manager 800 sends to conversation recorder 200 conversation metadata and participant metadata.

At operation 803 conversation manager 800 receives a request to create a conversation. Conversation manager 800 creates a conversation with no participants and stores information regarding the conversation in conversation management database 850.

At operation 804 conversation manager 800 receives a request to add a participant to the conversation created at operation 803. The request contains information such as (i) an identifier of the participant, and (ii) an identifier of the participant's device, such as a mobile phone.

At operation 805 conversation manager 800 instructs media bridge 860 to set up a connection to the participant's device.

At operation 806 media bridge 860 sets up an audio or audiovisual channel and connects the participant's device to the channel. At this point the participant is alone in the conversation.

At operation 807 conversation manager 800 receives a request to add an additional participant to the conversation created at operation 803. The request contains information similar to that received in the request at operation 804.

At operation 808 the conversation manager instructs media bridge 860 to add a connection to the additional participant's device.

At operation 809 media bridge 860 connects the additional participant's device to the same audio or audiovisual channel as the first participant. When this operation is performed, the first participant and the additional participant are connected via the channel and may talk to each other.

Operations 807, 808, and 809 may be repeated any number of times, thus adding any number of additional participants to the channel.

At operation 810 conversation manager 800 receives a request to remove from the conversation a previously added participant. The request contains an identifier of the participant.

At operation 811 conversation manager 800 instructs media bridge 860 to remove the participant from the conversation.

At operation 812 media bridge 860 disconnects the participant's device from the channel. At this point the disconnected participant is no longer in the conversation, but the other participants remain.

At operation 813 conversation manager 800 receives a request to close the conversation created at operation 803.

At operation 814 conversation manager 800 instructs media bridge 860 to close the connections to the participants in the conversation.

At operation 815 media bridge 860 closes the connections to all participants in the conversation. At this point the conversation is closed.

At operation 816 conversation manager 800 receives a request to create a conversation, where the request includes information regarding one or more participants to add to the conversation. Conversation manager 800 creates a conversation including the participants and stores information regarding the conversation in conversation management database 850.

At operation 817 conversation manager 800 instructs media bridge 860 to set up connections to the devices of the participants.

At operation 818 media bridge 860 sets up an audio or audiovisual channel and connects the participants' devices to the channel.

At operation 819 conversation manager 800 sends conversation metadata and conversation audio data to conversation recorder 200.

At operation 820 media bridge 860 sends conversation audio data to conversation recorder 200.

VIII. User Manager 900

Figure 12:
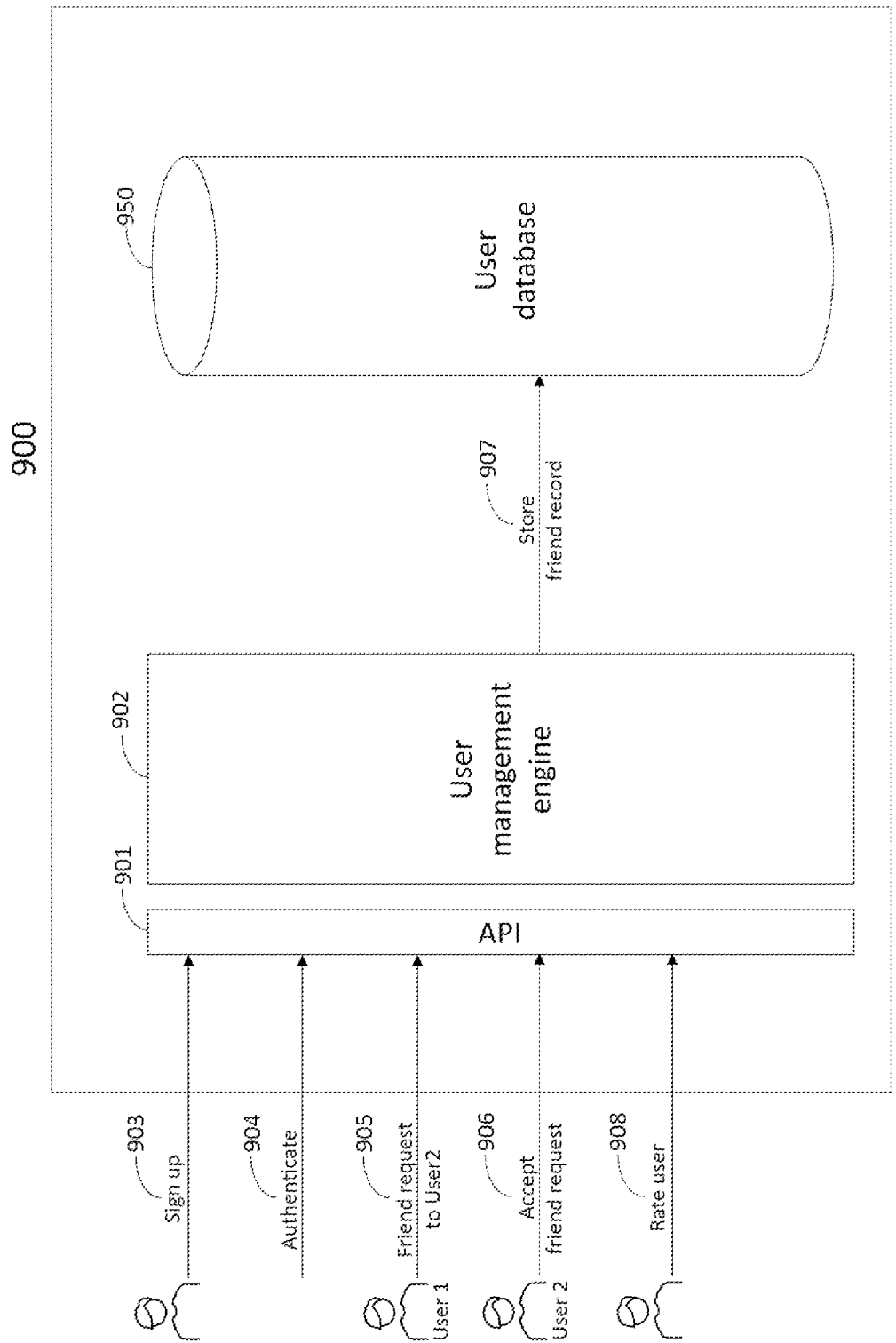
FIG. 12 is a high-level schematic diagram of a user manager, in accordance with an embodiment of the present invention.

Reference is made to FIG. 12, which is a high-level schematic diagram of a user manager, in accordance with an embodiment of the present invention. FIG. 12 includes API 901, user management engine 902, operations 903 through 908, and user database 950.

User manager 900 interfaces via API 901 with a conventional user interface such as a mobile application, a personal computer application, or an internet browser.

At operation 903 user manager 900 receives an API request to sign up a new user. User manager 900 performs a conventional user signup process and stores information about the user and user credentials in user database 950.

At operation 904 user manager 900 receives an API request to authenticate a user. The API request contains a unique identifier for the user and the user's credentials. User manager 900 performs a conventional authentication process and returns to the requester an authentication status.

At operation 905 user manager 900 receives an API request to send a friend request to another user. The API request contains an identifier of the requesting user and an identifier of the target user. User manager 900 stores the friend request in user database 950.

At operation 906 user manager 900 receives an API request to accept a friend request. The API request contains an identifier of the accepting user and an identifier of a user who previously sent a friend request to the accepting user. User manager 900 reads user database 950 and retrieves a friend request previously stored.

At operation 807 user manager 900 stores in user database 950 a record indicating that the requesting user and the accepting user are friends.

At operation 908 user manager 900 receives an API request to rate the likability of a second user. The API request contains an identifier of the rating user and an identifier of the second user.

In an embodiment of the present invention a likability rating constitutes only a positive rating of a user. In this embodiment user manager 900 stores in user database 950 a record indicating the fact that the rating user submitted a rating of "likable" for the second user.

In an alternative embodiment of the present invention a likability rating constitutes a set of discrete values, such as a positive rating of "likable", a negative rating of "dislikable", and a neutral rating of "neutral". In this embodiment user manager 900 stores in user database 950 a record indicating the fact that the rating user submitted a rating of the second user, and further stores in user database 950 the value of the rating.

In a further alternative embodiment of the present invention a likability rating constitutes a score. In this embodiment user manager 900 stores in user database 950 a record indicating the fact that the rating user submitted a likability rating of the second user, and further stores in user database 950 the likability rating score given.

IX. Social Network Manager 1000

Figure 13:
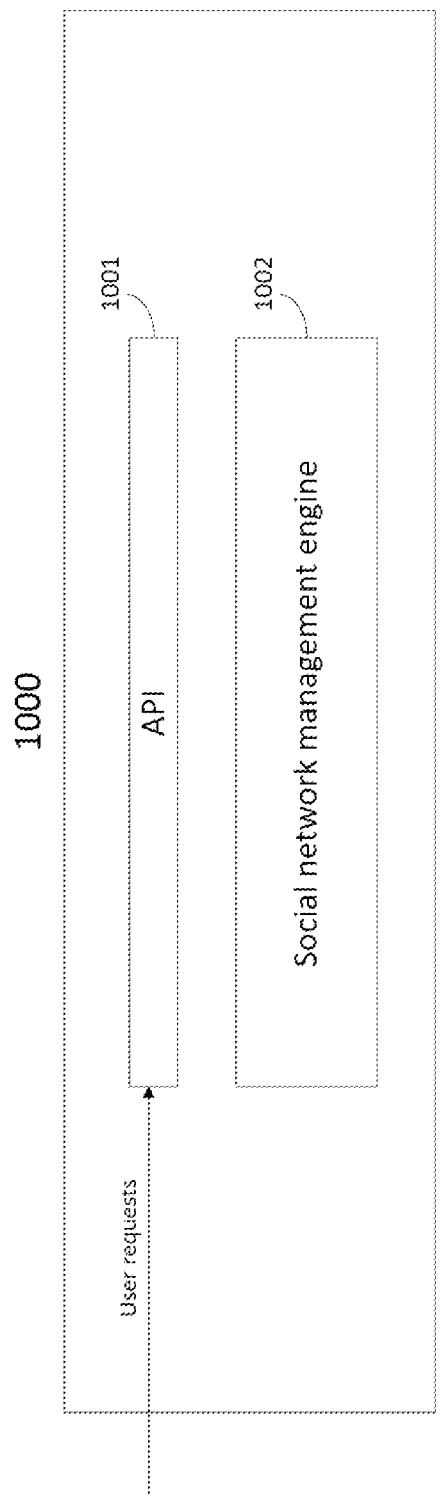
FIG. 13 is a high-level schematic diagram of a social network manager, in accordance with an embodiment of the present invention.

Reference is made to FIG. 13, which is a high-level schematic diagram of a social network manager in accordance with an embodiment of the present invention. FIG. 13 includes API 1001 and social network management engine 1002.

Social network manager 1000 allows users to converse with each other in one-on-one and multi-party conversations, and allows users to meet new people by joining conversations with people they don't know.

Social network manager 1000 allows a user to request a conversation with a second user. Social network manager 1000 identifies a conversation partner and sets up a conversation between the requesting user and the identified partner.

The identification of a partner is based on prior conversations of the requesting user and on prior conversations of other users.

Figure 14:
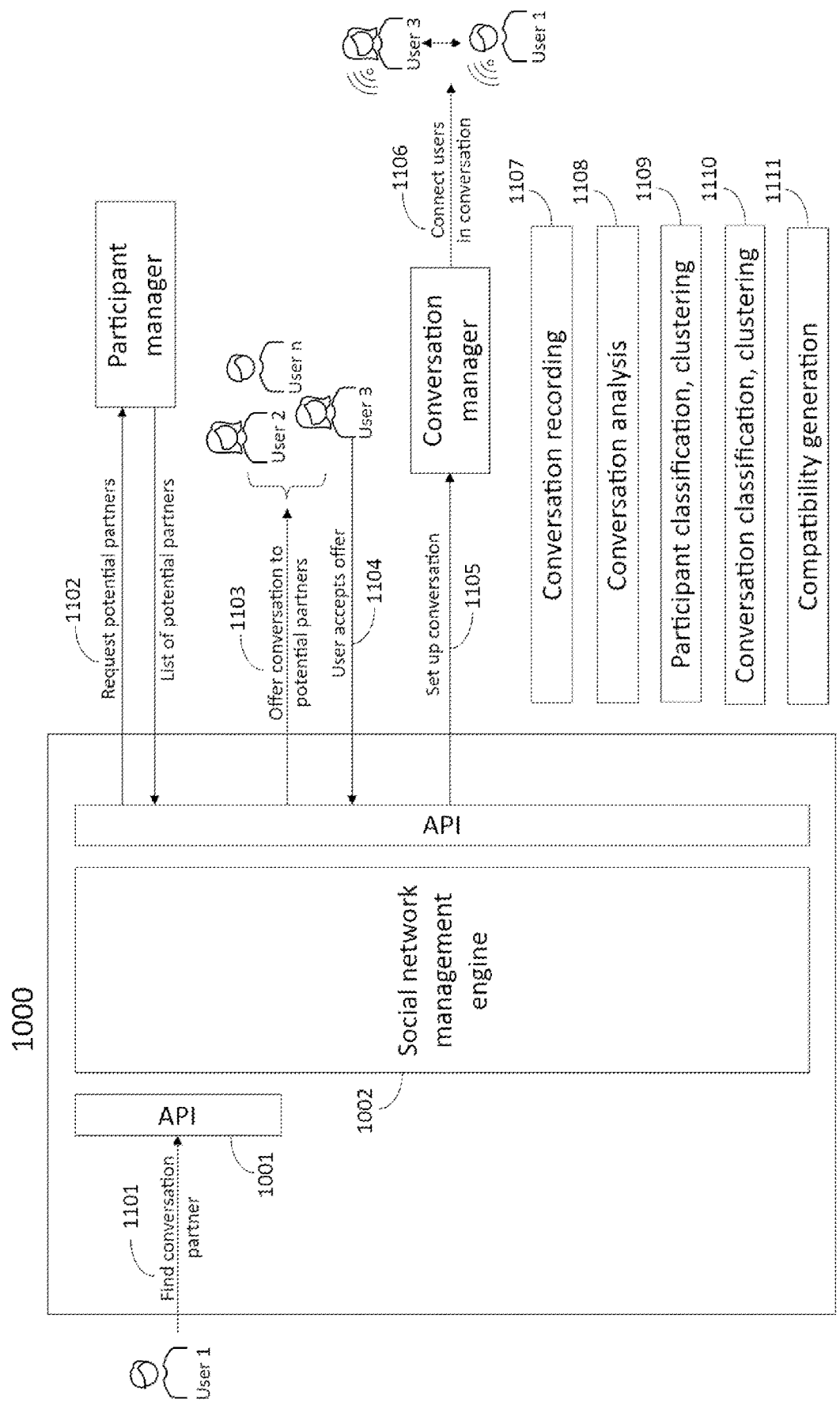
FIG. 14 is a high-level schematic diagram of a process of identifying a conversation partner and setting up a conversation, in accordance with an embodiment of the present invention.

Reference is made to FIG. 14, which is a high-level schematic diagram of a process of identifying a conversation partner and setting up a conversation, in accordance with an embodiment of the present invention.

At operation 1101 social network manager 1000 receives a request from a user to have a conversation with someone.

At operation 1102 social network manager 1000 calls participant manager 700 and requests a set of potential conversation partners for the requesting user. Participant manager 700 identifies a list of potential partners, as described hereinabove, and returns the list to social network manager 1000.

At operation 1103 social network manager 1000 sends messages to each of the potential partners offering a conversation with the first user.

At operation 1104 one of the potential partners responds affirmatively to the offer of a conversation.

At operation 1105 social network manager 1000 calls conversation manager 800 to set up the conversation between the requesting user the responding user.

At operation 1106 conversation manager 800 connects the two people in a conversation.

At operation 1107 conversation recorder 200 records the conversation as described hereinabove.

At operation 1108 conversation analyzer 300 analyzes the conversation as described hereinabove.

At operation 1109 participant classifier 400 performs classification and clustering operations on the participants in the conversation as described hereinabove.

At operation 1110 conversation classifier 500 performs classification and clustering operations on the conversation as described hereinabove.

At operation 1111 compatibility generator 600 generates compatibility data based on data generated by conversation recorder 200, conversation analyzer 300, participant classifier 400, and conversation classifier 500, as described hereinabove.

Social network manager 1000 further sets up conversations between users where the users have not initiated a request for a conversation. Social network manager 1000 identifies potential conversation partners and sets up conversations between the identified partners.

Figure 15:
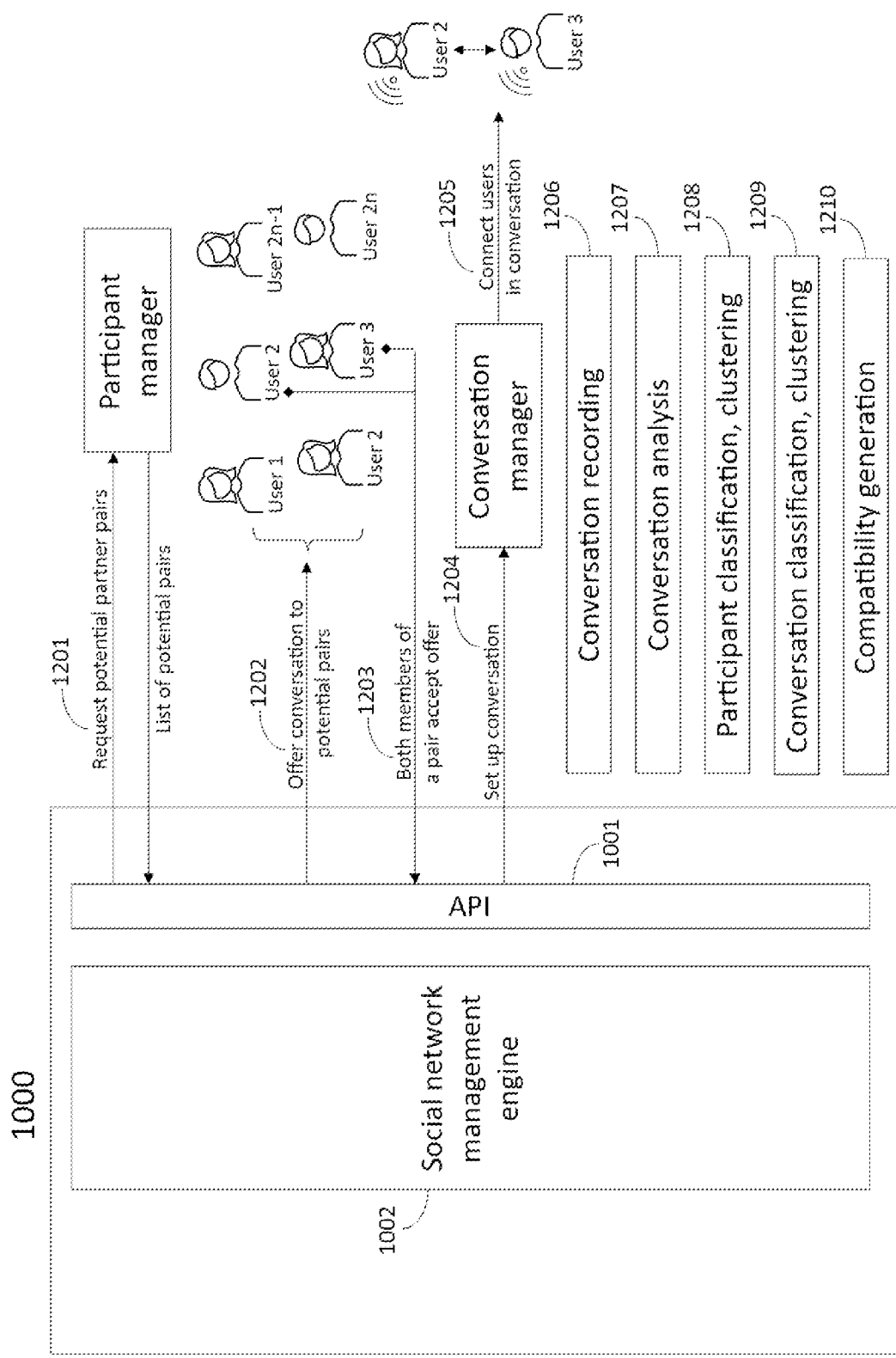
FIG. 15 is a high-level schematic diagram of a process of setting up a conversation between a pair of users where the users have not explicitly requested a conversation, in accordance with an embodiment of the present invention.

Reference is made to FIG. 15, which is a high-level schematic diagram of a process of setting up a conversation between a pair of users where the users have not explicitly requested a conversation, in accordance with an embodiment of the present invention.

At operation 1201 social network manager 1000 calls participant manager 700 and requests sets of potential conversation partners. Participant manager 700 identifies a list of potential pairs, as described hereinabove, and returns the list to social network manager 1000.

At operation 1202 social network manager 1000 sends messages to each user in each of the potential pairs, offering a conversation.

At operation 1203 both members of a specific potential pair respond affirmatively to the offer of a conversation.

At operation 1204 social network manager 1000 calls conversation manager 800 to set up a conversation between the two responding users.

At operation 1205 conversation manager 800 connects the two people in the conversation.

At operation 1206 conversation recorder 200 records the conversation as described hereinabove.

At operation 1207 conversation analyzer 300 analyzes the conversation as described hereinabove.

At operation 1208 participant classifier 400 performs classification and clustering operations on the participants in the conversation, as described hereinabove.

At operation 1209 conversation classifier 500 performs classification and clustering operations on the conversation, as described hereinabove.

At operation 1210 compatibility generator 600 generates compatibility data based on data generated by conversation recorder 200, conversation analyzer 300, participant classifier 400, and conversation classifier 500, as described hereinabove.

Social network manager 1000 further sets up conversations in "rooms", where multiple users can join a room and talk to each other.

Figure 16:
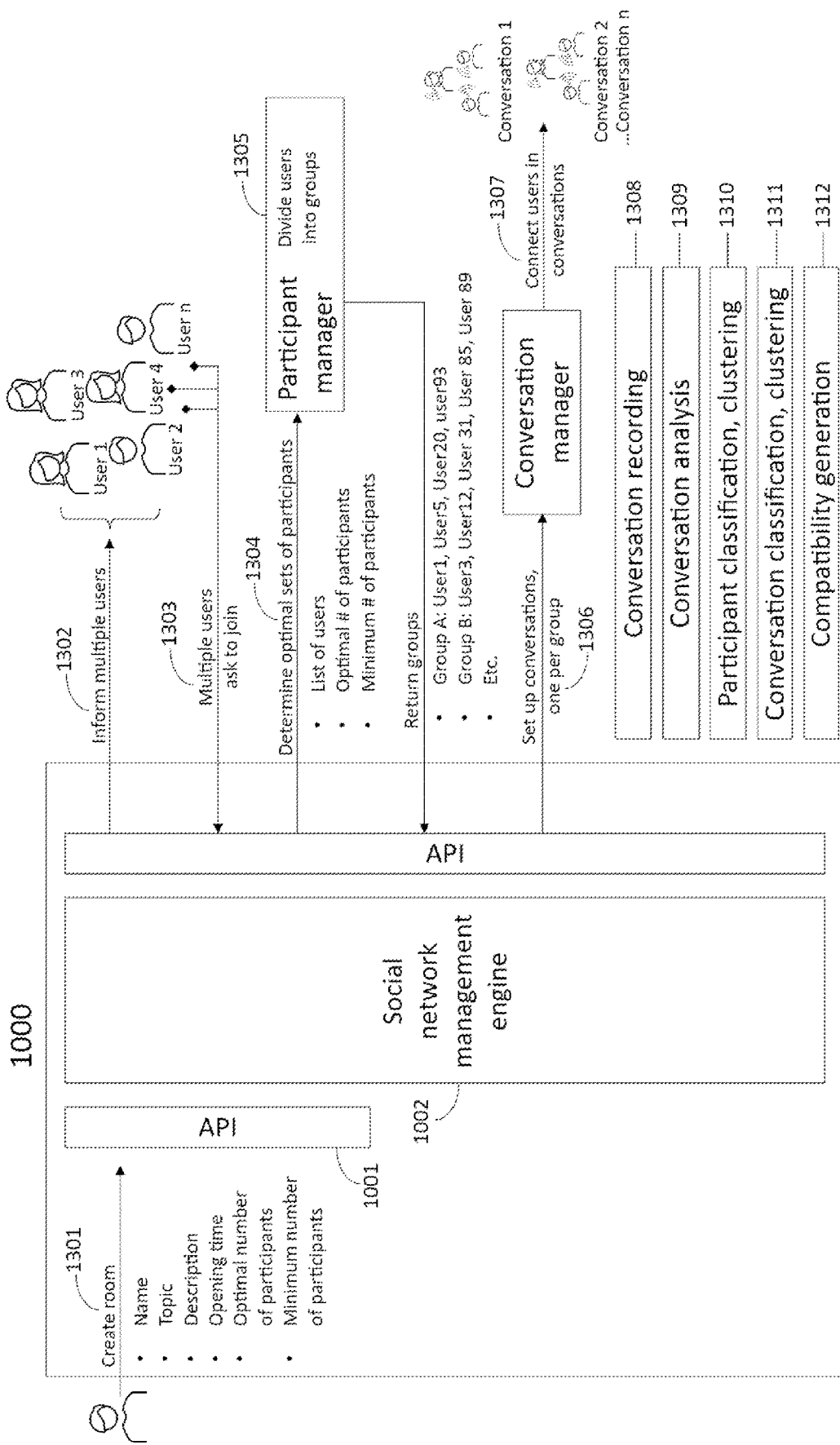
FIG. 16 is a high-level schematic diagram of a process of setting up a room, in accordance with an embodiment of the present invention.

Reference is made to FIG. 16, which is a high-level schematic diagram of a process of setting up a room, in accordance with an embodiment of the present invention.

At operation 1301 social network manager 1000 receives a request to create a room. The request contains metadata including (i) a name for the room, (ii) a topic for the room, (iii) a description for the room, (iv) an opening time for the room, (v) an optimal number of participants for each instance of the room, and (vi) a minimum number of participants for any instance of the room.

In an embodiment of the present invention the request to create a room is made by a user of the social network. In an alternative embodiment the request is made by an administrator of the social network.

At operation 1302 social network manager 1000 sends messages to multiple users informing them of the room.

At operation 1303 multiple users inform social network manager 1000 that they would like to join the room when it opens.

At operation 1304 social network manager 1000 calls participant manager 700, providing a list of users who indicated that they would like to join the room, and providing the optimal and minimum numbers of participants for a room instance.

At operation 1305 participant manager 700 divides the users into groups, as described hereinabove, each group representing an instance of the room, and returns the groups to social network manager 1000.

At operation 1306 social network manager 1000 calls conversation manager 800 for each group, to set up a conversation for the group.

At operation 1307 conversation manager 800 connects the members of each group in a conversation.

At operation 1308 conversation recorder 200 records each of the conversations, as described hereinabove.

At operation 1309 conversation analyzer 300 analyzes the conversations, as described hereinabove.

At operation 1310 participant classifier 400 performs classification and clustering operations on the participants in the conversations, as described hereinabove.

At operation 1311 conversation classifier 500 performs classification and clustering operations on the conversations, as described hereinabove.

At operation 1312 compatibility generator 600 generates compatibility data based on data generated by conversation recorder 200, conversation analyzer 300, participant classifier 400, and conversation classifier 500, as described hereinabove.

Social network manager 1000 further allows a user to join a room.

As described hereinabove, social network manager 1000 notifies users of a room, and divides users into multiple room instances. After such a set of users has been divided into room instances, an additional user may inform social network manager 1000 of his or her desire to join the room.

In an embodiment of the present invention a user may so inform after a set of users has been divided into room instances, but before the room has opened.

In an alternative embodiment of the present invention a user may so inform when the room instance conversations are already in progress.

Figure 17:
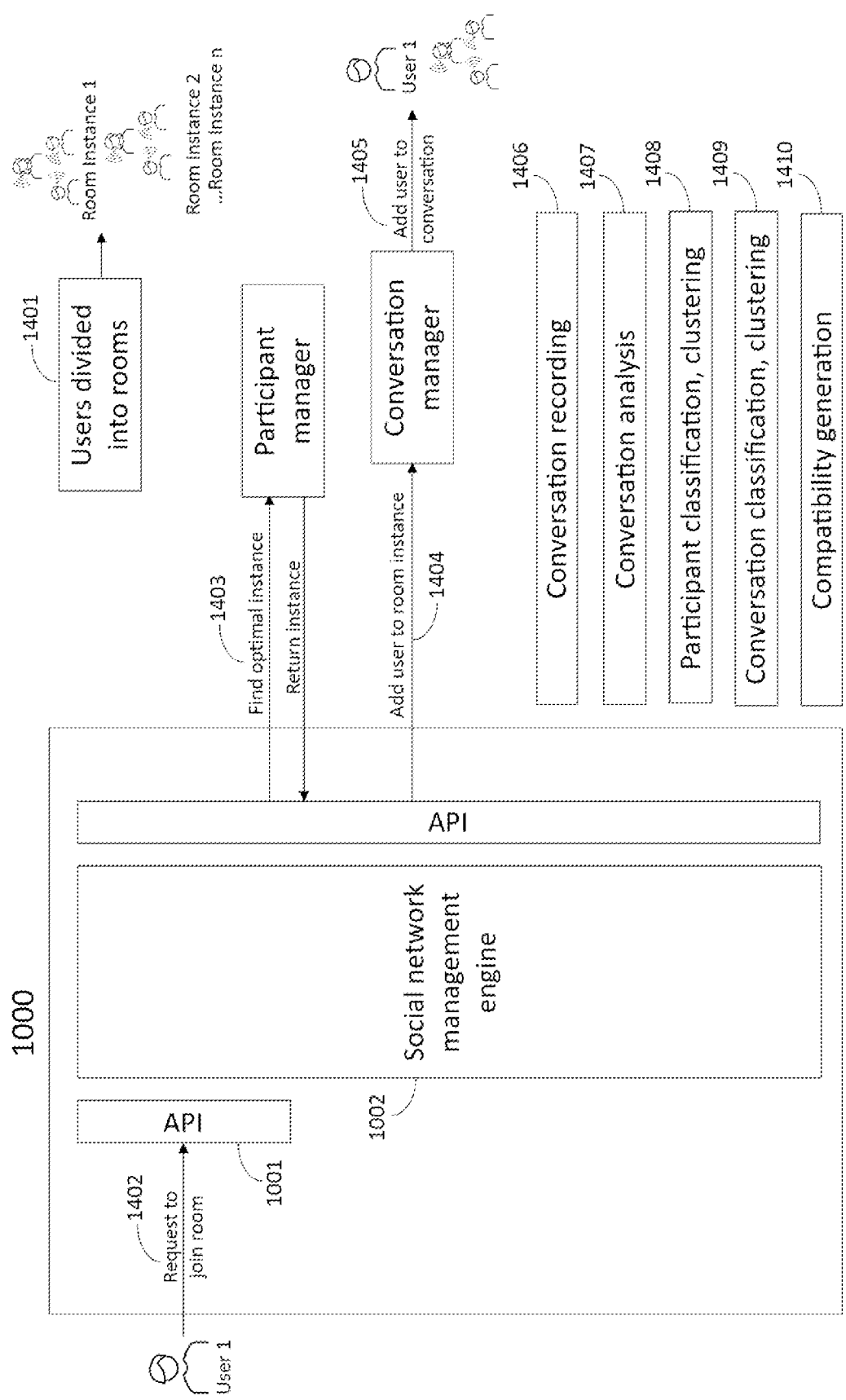
FIG. 17 is a high-level schematic diagram of a process of a user joining a room, in accordance with an embodiment of the present invention.

Reference is made to FIG. 17, which is a high-level schematic diagram of a process of a user joining a room, in accordance with an embodiment of the present.

At operation 1401 a set of users is divided into room instances as described hereinabove.

At operation 1402 a user informs social network manager of his or her desire to join the room.

At operation 1403 social network manager 1000 calls participant manager 700, providing an identifier of the user and identifiers of the instances of the room. Participant manager 700 identifies a room instance in which to place the user, as described hereinabove, and returns an identifier of the instance to social network manager 1000.

At operation 1404 social network manager 1000 calls conversation manager 800 to add the user to the room instance.

At operation 1405 conversation manager 800 connects the user to the conversation of the designated room instance.

At operation 1406 conversation recorder 200 records the room instance conversation as described hereinabove.

At operation 1407 conversation analyzer 300 analyzes the room instance conversation as described hereinabove.

At operation 1408 participant classifier 400 performs classification and clustering operations on the participants in the room instance conversation as described hereinabove.

At operation 1409 conversation classifier 500 performs classification and clustering operations on the room instance conversation as described hereinabove.

At operation 1410 compatibility generator 600 generates compatibility data based on data generated by conversation recorder 200, conversation analyzer 300, participant classifier 400, and conversation classifier 500, as described hereinabove.

In the foregoing specification, the invention has been described with reference to a specific embodiment in the field of social networking. However, it will be appreciated by those skilled in the art that embodiments of the invention have widespread application to other fields.

One such application is in the field of dating. A primary goal of dating systems is to determine a compatibility between individuals, and introduce individuals to one another, for the purpose of establishing relationships. It is evident that determinations of compatibility and selection of participants for conversations, as described hereinabove, are beneficial for dating systems by increasing the likelihood that users so introduced will find each other mutually compatible.

An additional such application is in the field of sales. A common goal of salespeople when speaking with potential customers is the establishment of conversational rapport. It is evident that determinations of compatibility and selection of participants for conversations, as described hereinabove, are beneficial for teams of salespeople by increasing the likelihood that a given salesperson is assigned potential customers with which he or she has the highest likelihood of being able to establish a good rapport.

A further such application is in the field of customer support. When a user contacts a customer support service, it may be the case that the user is already displeased. This increases the likelihood of a confrontational conversation with a support representative. It is evident that selecting a support representative with a conversational compatibility with the customer will decrease the likelihood of confrontation and increase the likelihood of a successful resolution of the support call. It is further evident that determinations of compatibility and selection of participants for conversations, as described hereinabove, are beneficial for assigning customers to customer support representative in a manner that increases the likelihood of successful resolution of support calls, thereby increasing overall customer satisfaction.

Yet a further such application is in the field of support groups. A common goal of support groups is to establish conversations with groups of individuals who all share a common background or history, with the intent for members to provide mutual support. It is evident that establishing groups who are able to maintain conversations that are engaging for all participants is beneficial for the outcomes of the conversations. It is further evident that determinations of compatibility between multiple participants and dividing participants into groups, as described hereinabove, are beneficial for such groups and for organizations managing such groups.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims.

Accordingly, the specification and drawings are to be regarded in an illustrative rather than a restrictive sense.

What is claimed is:

1. A system for generating live online real-time conversations, comprising:
- a media bridge connecting participants in the live online real-time conversations over a network;
- a conversation recorder recording to a computer storage medium audio of multiple live online real-time conversations;
- a conversation analyzer (i) analyzing audio of participants of the multiple live online real-time conversations recorded by said conversation recorder, (ii) determining behavioral attributes of each participant's speech in the conversations, wherein a behavioral attribute of a participant's speech is an attribute that is related to the audio but unrelated to the words spoken, and (iii) determining quality levels for the conversations, based on the behavioral attributes;
- a social network manager receiving a request from a plurality of the participants to join a live online real-time conversation; and
- a conversation manager (i) generating the multiple live online real-time conversations according to the number of requests received by said social network manager, (ii) allocating the requesting participants to the generated live online real-time conversations, based on the attributes of the requesting participants and based on the quality levels, determined by said conversation analyzer, in response to said social network manager receiving the request, and (iii) connecting the requesting participants to their respective allocated live online real-time conversations via said media bridge.

2. The system of claim 1 where the behavioral attributes include a relative length of time that a participant was talking in the multiple online conversations as compared to the other participants.

3. The system of claim 1 where the behavioral attributes include a number of times that a participant interrupted other participants in the respective multiple online conversations.

4. The system of claim 1 where the behavioral attributes include a number of times that a participant was interrupted by other participants in the respective multiple online conversations.

5. The system of claim 1 where the behavioral attributes include a number of times that a participant stopped talking when interrupted by other participants in the respective multiple online conversations.

6. The system of claim 1 where the behavioral attributes include an emotional state of a participant in the respective multiple online conversations.

7. The system of claim 1 wherein the online real-time conversations include video components.

8. The system of claim 1 wherein the quality level of a live online real-time conversation is determined based on a length of the online conversation.

9. The system of claim 1 wherein the quality level of a live online real-time conversation is determined based on a number of times that participants joined and left the online conversation.

10. The system of claim 1 wherein the quality level of a live online real-time conversation is determined based on emotional states of participants in the online conversation.

11. The system of claim 1 wherein the quality level of a live online real-time conversation is determined based on a number of times participants interrupted other participants in the online conversation.

12. The system of claim 1 wherein the quality level of a live online real-time conversation is determined based on lengths of time participants were talking in the online conversation.

13. The system of claim 1 wherein the quality level of a live online real-time conversation is determined based on a quality rating by the participants in the online conversation.

14. The system of claim 1 wherein the quality level of a live online real-time conversation is determined by a third party.

* * * * *